US 8,968,575 B2

(12) United States Patent
Zolotarsky et al.

(10) Patent No.: US 8,968,575 B2
(45) Date of Patent: Mar. 3, 2015

(54) METHOD AND SYSTEM FOR TREATING BALLAST WATER

(75) Inventors: Vadim Zolotarsky, Springfield, NJ (US); Irina A. Ivanter, Sayreville, NJ (US); Louis J. Lombardo, Brick, NJ (US); Robert Weddle, Little Elm, TX (US); Michael Upjohn, Llandogo (GB)

(73) Assignee: Evoqua Water Technologies LLC, Warrendale, PA (US)

( * ) Notice: Subject to any disclaimer, the term of this patent is extended or adjusted under 35 U.S.C. 154(b) by 1346 days.

(21) Appl. No.: 12/673,574

(22) PCT Filed: Aug. 14, 2008

(86) PCT No.: PCT/US2008/009716
§ 371 (c)(1),
(2), (4) Date: Feb. 9, 2011

(87) PCT Pub. No.: WO2009/023241
PCT Pub. Date: Feb. 19, 2009

(65) Prior Publication Data
US 2011/0120956 A1    May 26, 2011

Related U.S. Application Data

(60) Provisional application No. 60/956,057, filed on Aug. 15, 2007, provisional application No. 61/043,795, filed on Apr. 10, 2008.

(51) Int. Cl.
*C02F 1/50* (2006.01)
*C02F 1/46* (2006.01)
(Continued)

(52) U.S. Cl.
CPC .............. *C02F 1/4674* (2013.01); *B63J 4/00* (2013.01); *C02F 1/16* (2013.01); *B63J 4/002* (2013.01);
(Continued)

(58) Field of Classification Search
CPC ............. B01F 15/06; B63J 4/00; B63J 4/002; B63J 4/004; C02F 1/76
USPC ............. 210/85, 96.1, 170.11, 188, 205, 243, 210/257.1, 259, 739, 747.5, 748.1, 748.12, 210/748.17, 748.2, 806; 114/125; 204/555, 204/556, 661, 665; 95/241; 96/155, 219
See application file for complete search history.

(56) References Cited

U.S. PATENT DOCUMENTS 3,458,413 A * 7/1969 Horiguchi et al. ............ 205/724
5,616,234 A    4/1997 Rhees et al.
(Continued)

FOREIGN PATENT DOCUMENTS

CN    1842495 A    10/2006
EP    1340719 A2    9/2003
(Continued)

OTHER PUBLICATIONS

Downstream. 2013. In Merriam-Webster.com. Retrieved Jan. 13, 2013, from http://www.merriam-webster.com/dictionary/downstream.*
(Continued)

*Primary Examiner* — Lucas Stelling
*Assistant Examiner* — Rohit K Dewan

(57) ABSTRACT

Ballast and/or cooling water biocidal treatment and disinfection systems and techniques are provided. The systems utilize oxidation reduction potential control to regulate addition, or concentration of an electrocatalytically generated biocidal agent to disinfection levels in ship buoyancy and to biofouling levels in ship cooling water systems. The disinfection and biofouling control systems provide suitable treatment while reducing the potential for corrosion of ship components and, in some cases, undesirable disinfection byproducts.

15 Claims, 17 Drawing Sheets

(51) Int. Cl.

| | | |
|---|---|---|
| *C02F 1/76* | (2006.01) | |
| *C02F 1/467* | (2006.01) | |
| *B63J 4/00* | (2006.01) | |
| *C02F 1/16* | (2006.01) | |
| *C02F 1/20* | (2006.01) | |
| *C02F 1/00* | (2006.01) | |
| *C02F 1/461* | (2006.01) | |
| *C02F 103/00* | (2006.01) | |

(52) U.S. Cl.
CPC . *B63J 4/004* (2013.01); *C02F 1/20* (2013.01); *C02F 1/46* (2013.01); *C02F 1/001* (2013.01); *C02F 2001/46128* (2013.01); *C02F 2001/46138* (2013.01); *C02F 2001/46152* (2013.01); *C02F 2001/46185* (2013.01); *C02F 2103/008* (2013.01); *C02F 2209/006* (2013.01); *C02F 2209/04* (2013.01)
USPC ...... 210/746; 210/205; 210/756; 210/748.17; 210/143; 210/192; 210/242.1; 114/125

(56) References Cited

U.S. PATENT DOCUMENTS

| | | | |
|---|---|---|---|
| 6,183,646 B1* | 2/2001 | Williams et al. | 210/636 |
| 6,573,734 B2 | 6/2003 | He | |
| 7,540,251 B2* | 6/2009 | Jung et al. | 114/125 |
| 2005/0016933 A1* | 1/2005 | Perlich et al. | 210/754 |
| 2006/0156744 A1* | 7/2006 | Cusiter et al. | 62/50.2 |
| 2007/0017801 A1 | 1/2007 | Fukui | |
| 2007/0158208 A1 | 7/2007 | Jung | |

FOREIGN PATENT DOCUMENTS

| | | | | |
|---|---|---|---|---|
| JP | 49-102153 | | 9/1974 | |
| JP | 8-158086 A | | 6/1996 | |
| JP | H08-292172 A | | 11/1996 | |
| JP | 10-314742 A | | 2/1998 | |
| JP | 2003145160 A | * | 5/2003 | ............... C02F 1/46 |
| JP | 2004-066195 A | | 3/2004 | |
| JP | 2004-534630 A | | 11/2004 | |
| JP | 2005-350745 A | | 12/2005 | |
| JP | 2006-239556 A | | 9/2006 | |
| JP | 2007-144391 A | | 6/2007 | |
| JP | 2007-152264 A | | 6/2007 | |
| JP | 2007-515289 A | | 6/2007 | |
| JP | 2007144391 A | * | 6/2007 | ............... C02F 1/50 |
| KR | WO 2005061394 | * | 7/2005 | ............... B63B 9/08 |
| WO | 2004054932 A1 | | 7/2004 | |
| WO | 2004079051 A1 | | 9/2004 | |
| WO | 2005061388 A1 | | 7/2005 | |
| WO | 2005061394 A1 | | 7/2005 | |
| WO | 2005077833 A1 | | 8/2005 | |
| WO | 2006132157 A1 | | 12/2006 | |
| WO | 2007032577 A1 | | 3/2007 | |
| WO | 2007049139 A2 | | 5/2007 | |

OTHER PUBLICATIONS

Lou Ge, "Technical Improvement to Seawater Electrolyzing Device," China Plant Engineering, Issue 10, 2003 (Translation not available).

* cited by examiner

METHOD AND SYSTEM FOR TREATING BALLAST WATER

CROSS REFERENCE TO RELATED APPLICATIONS

This application is a U.S. national stage application and claims the benefit under 35 U.S.C. §371 of International Application No. PCT/US2008/009716 filed on Aug. 14, 2008, entitled METHOD AND SYSTEM FOR TREATING BALLAST WATER, which claims priority under 35 U.S.C. §119(e) to U.S. Provisional Application Ser. No. 60/956,057 entitled PROCESS FOR DISINFECTION OF BALLAST WATER, filed on Aug. 15, 2007 and to U.S. Provisional Application Ser. No. 61/043,795 entitled METHOD AND SYSTEM FOR TREATING BALLAST WATER, filed on Apr. 10, 2008 each of which is herein incorporated by reference in their entirety and to which this application claims the benefit of priority.

BACKGROUND OF INVENTION

1. Field of Invention

The present invention relates to ship buoyancy disinfection and biofouling treatment systems and techniques and, in particular, to utilizing oxidation reduction potential values to regulate and control electrocatalytic generation of chlorine-based oxidizing agents or biocides.

2. Discussion of Related Art

Chlorine based disinfection systems typically utilize any of dry chlorine gas, bulk sodium hypochlorite, and in-situ chlorine or sodium hypochlorite electrolytic generators. The electrolysis of seawater to produce chlorine has been used in land-based industrial and off-shore applications for biofouling control of cooling systems, such as systems that utilize seawater as a coolant. The development of self-cleaning tube-in-tube electrochemical cells has resulted in use of electrochlorination in shipboard applications, such as for biofouling control of engine cooling system, and air conditioning and other auxiliary systems.

A typical system layout for a land based chlorination system is schematically presented in FIG. 1A. Seawater is taken from a water intake or source 1 and pumped through an electrolytic generator 3 by a pump 2. The outlet of generator 3 containing a biocidal agent is delivered into a storage tank 5. A power supply 4 provides electrical current to electrolytic chlorine generator 3.

Storage tank 5 is typically equipped with one or more air blowers 6 that provide dilution or dispersion of a hydrogen gas by-product to a safe concentration. Direct hydrogen removal can be effected with hydrocyclones instead of the air blowers and tanks. Land based systems can produce hypochlorite solutions at relatively high concentrations, in a range of about 500 ppm to 2,000 ppm chlorine. One or more dosing pumps 7 can be utilized to dose chlorine to a point of use typically by way of a distribution device 8. The point of use is typically an intake basin which provides water to another process such as, but not limited to, a cooling loop 9.

In some applications, dechlorination systems and techniques may utilize an oxidizer-neutralizing agent, such as sodium bisulfite, for downstream treatment of the potable water or cooling water, prior to discharge or use thereof.

Ships use ballast water tanks to provide stability and maneuverability. Typically, ballast tanks are filled with water at one port after or during cargo unloading operations. The ballast water may be discharged at another port if cargo is loaded. Effectively, the ballast water would be transferred from the first port to the second port, with a potential for the introduction of aquatic nuisance species (ANS) at the second port. ANS transfer can be a detrimental ecological issue. Shipboard electrochlorination systems, as schematically illustrated in FIG. 1B, are typically configured for low chlorine output with direct injection of chlorinated water. In shipboard electrochlorination systems seawater is typically delivered from a sea chest 1 or a main using a booster pump 2 to an electrolytic generator 3. Generator 3 is typically powered by a power supply 4. A product stream from generator 3 is typically injected into sea chest 1 through a distribution device 8. In shipboard systems, cooling water is typically discharged outboard D and can be de-chlorinated by introducing an neutralizing agent, such as sodium bisulfite, from a source 11 to reduce the chlorine concentration therein to an allowable discharge level, typically less than 0.1 ppm.

Typically, a chlorine analyzer is utilized to monitor and maintain a concentration of residual chlorine in treated water. Such systems, however, do not consider variabilities in chlorine demand in different ports where ballasting operations may occur. For example, chlorine demand may be affected by the concentration of nitrogen compounds in seawater, which may vary significantly from port to port and from season to season due to, for example, an algae bloom. FIG. 2 shows seasonal variations in ammonium and nitrate levels in the North Sea off the Texel Island, the Netherlands (provided by the Royal Netherlands Institute for Oceanographic Research (NIOZ)). The fluctuations in chlorine demand can create a higher than desirable or acceptable oxidizer concentration, such as a high free chlorine concentration, in the various shipboard systems which, in turn can accelerate or even promote corrosion of the ship systems and ancillary unit operations such as but not limited to ballast water pumps, piping, and tanks. The variabilities can also promote formation of disinfection byproducts (DBP).

SUMMARY OF THE INVENTION

One or more aspects of the invention can be directed to shipboard water treatment systems. The treatment system can comprise a source of ballast water; a sensor disposed to measure and transmit a measured signal representative of an oxidation reduction potential of the ballast water; a biocide source disposed to introduce a biocide into the ballast water; and a controller disposed to receive the measured signal from the sensor, and configured to generate and transmit an output signal, based at least partially on the measured signal and a target ORP value in a range of from about 200 mV to about 900 mV to the biocide source to regulate a rate of introduction of the biocide into the ballast water.

One or more aspects of the invention can be directed to a method of treating water to be introduced into a ballast tank. In some embodiments thereof, the method of treating water to be introduced into the ballast tank can comprise introducing a biocide into the water; and regulating a rate of introduction of the biocide to achieve a target water oxidation reduction potential value in a range of from about 200 mV to about 900 mV in the water One or more aspects of the invention can be directed to a method of modifying a ballast water system having a ballast tank connected to a source of seawater. In some embodiments thereof, the method of modifying the ballast water system can comprise connecting an inlet of an electrolyzer to the source of seawater, connecting an outlet of the electrolyzer outlet to an inlet of a degassing tank, and connecting a controller to the electrolyzer and to an oxidation reduction potential sensor disposed downstream of an outlet of the degassing tank, the controller configured to regulate an operating parameter of the electrolyzer to achieve a target oxidation reduction potential value in a range of from about 200 mV to about 900 mV in the seawater to be introduced into the ballast tank.

One or more aspects of the invention can be directed to a shipboard water treatment system on a ship in a body of water. The treatment system can comprise a source of water containing at least one chloride species, a filter fluidly connected to at least one of the source and the body of water, a ballast tank fluidly connected downstream from the filter, a sensor disposed to measure and transmit a measured signal representative of an oxidation reduction potential of the seawater, a biocide source disposed to introduce a biocide into the ballast tank, and a controller disposed to receive the measured signal from the sensor, and configured to generate and transmit an output signal, based at least partially on the measured signal and a target oxidation reduction potential value in a range of from about 200 mV to about 1,000 mV, to the biocide source to regulate a rate of introduction of the biocide into at least one of the ballast tank and into water to be introduced into the filter.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing.

In the drawings.

DETAILED DESCRIPTION

Figure 1A:
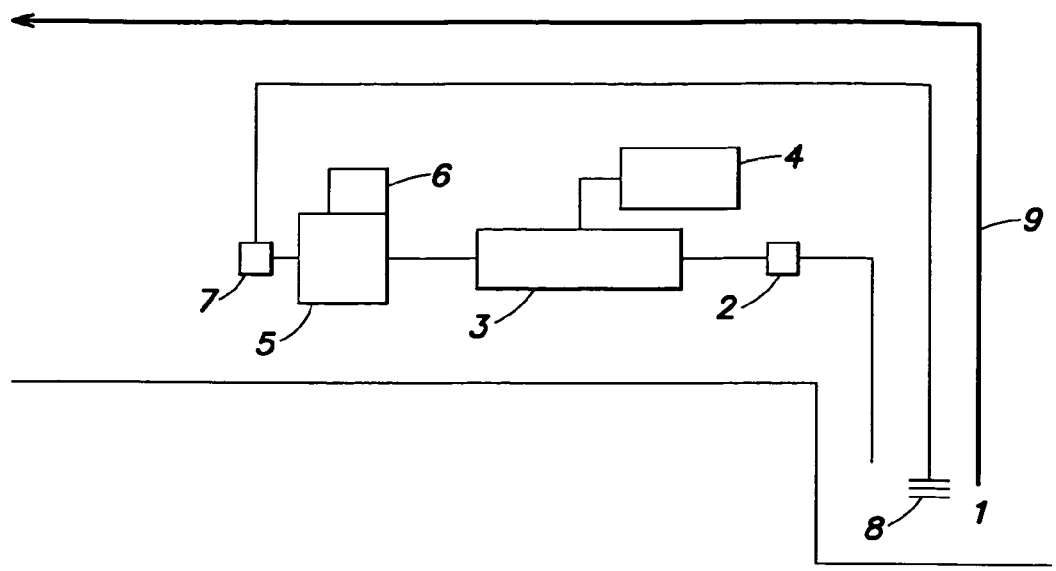
FIGS. 1A and 1B are schematic illustrations of land-based (FIG. 1A) and shipboard (FIG. 1B) chlorination systems.
Figure 1B:
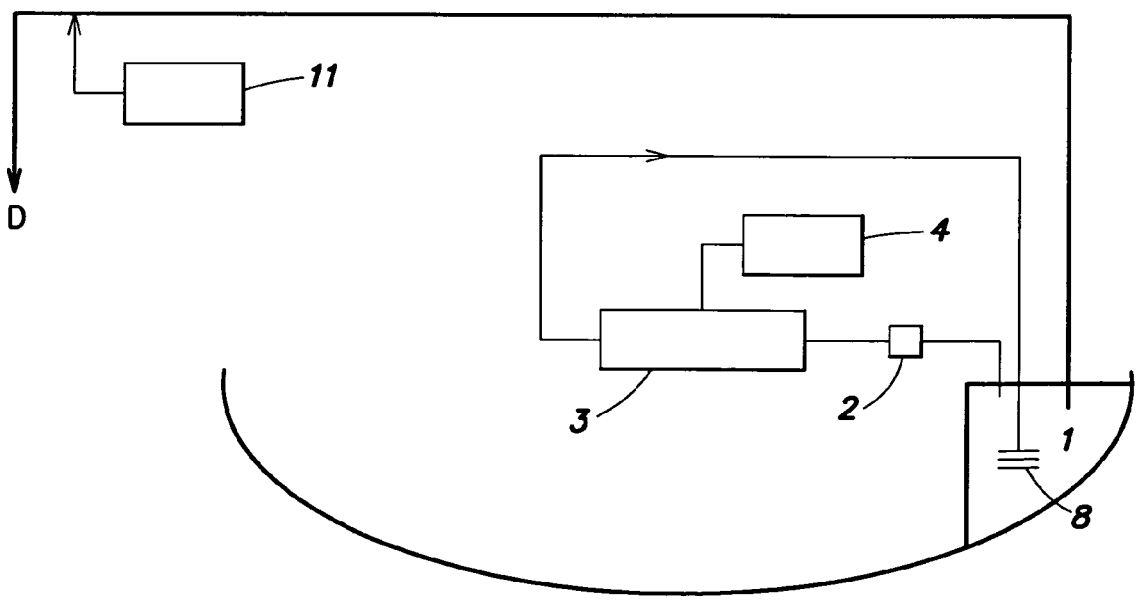
Figure 2:
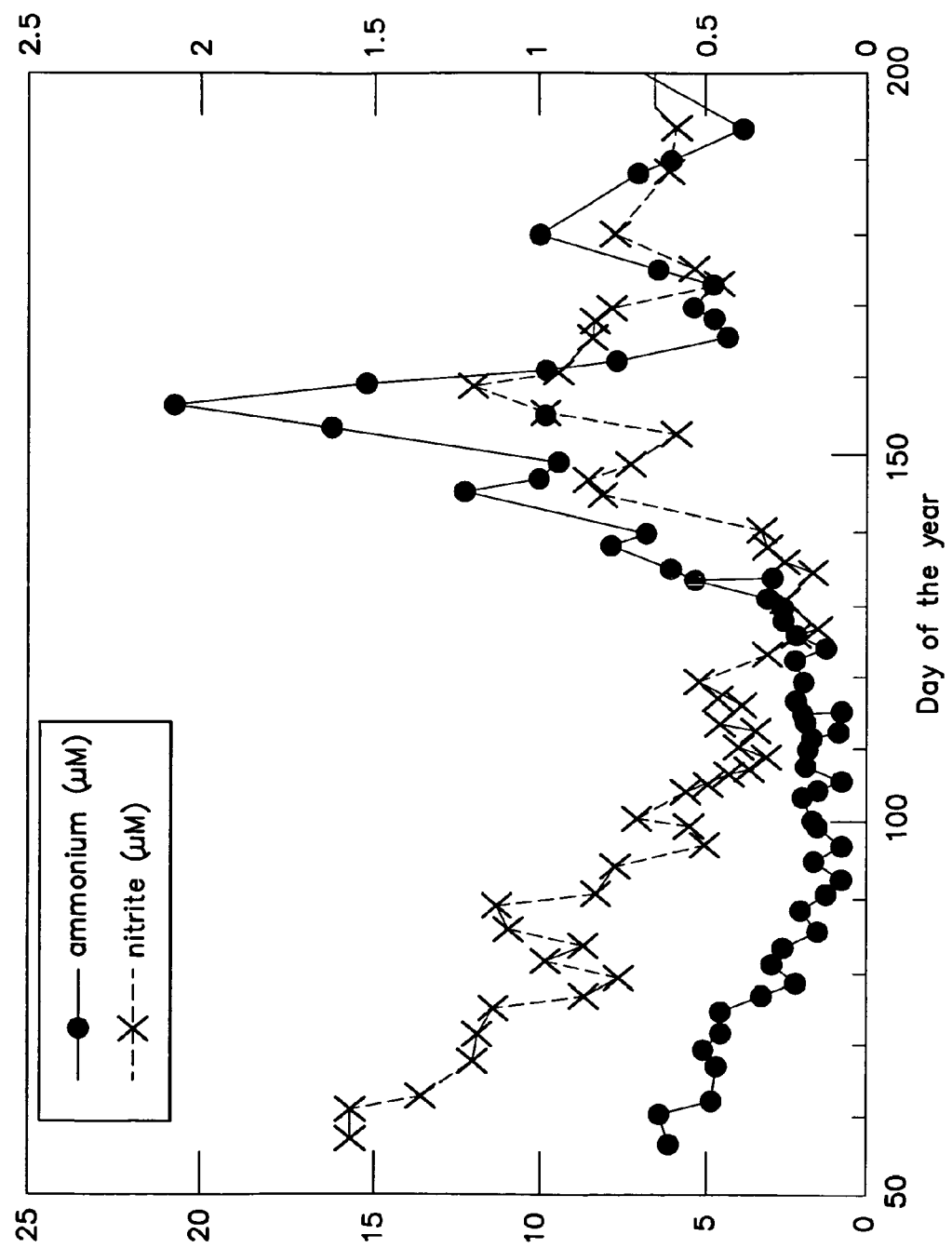
FIG. 2 is a graph illustrating the ammonium and nitrate concentrations in the North Sea, off the coast of Texel Island, the Netherlands over a portion of a year.

Some aspects of the present disclosure provide ballast water treatment systems and techniques that can, inter alia, reduce the likelihood of ANS dispersion, and, in some cases, provide discharged ballast water that has acceptable levels of biocides. Other aspects of the disclosure provide treatment systems and techniques that control biocide concentrations without further remediation subsystems and techniques before the treated water can be discharged from a mobile or stationary facility. Other aspects of the disclosure provide treatment systems and techniques to maintain an oxidation reduction potential value in ballast water in a ship sufficient to remediate ANS. Still other aspects of the disclosure provide systems and techniques of controlled electrolytic treatment of ballast water. Yet other aspects of the disclosure provide systems and techniques that compensate for variations in load or demand. Some advantageous aspects of the disclosure provide systems and techniques that reduce the likelihood of excess or undesirable levels of oxidizing biocidal agents. Further aspects of the disclosure provide retrofitting or modification of existing mobile or stationary electrolytic water facilities. Still further aspects of the disclosure advantageously rely on treating systems utilizing a heretofore not recognized range of ORP control. Even further aspects of the disclosure relate to facilitating any of the above noted aspects.

For example, the present invention relates, in some cases, to disinfection systems and techniques for treating ballast water in ship buoyancy systems and biofouling control or treatment in other ship systems. The treatment system can be based, at least partially, on at least one measured characteristic of the ballast water. Some aspects of the invention can provide minimal level of a biocide or biocidal agent, such as an oxidizer, that still provides or even ensures disinfection of ballast water, preferably while minimizing corrosion of the water containing structures as well as minimal formation of potentially hazardous disinfection byproducts. In some embodiments, the treatment systems of the invention can be based, at least partially, on an oxidation reduction potential of water to be treated or being treated. Some particular aspects of the invention provide systems and techniques that advantageously provide minimal levels of free available chlorine, or provide free available chlorine concentrations that ensure effective disinfection of ballast water while minimizing corrosion of the ship structures and ancillary unit operations, and, in some cases, minimal or at least reduced formation of potentially hazardous disinfection byproducts.

One or more aspects of the invention can be particularly directed to a shipboard treating system for cooling water systems and ballast water systems. The treatment system can comprise a source of ballast water, seawater, water containing a chloride species or combinations thereof; a sensor disposed to measure and transmit a measured signal representative of an oxidation reduction potential of the ballast water; a biocide source disposed to introduce a biocide into the ballast water; and a controller disposed to receive the measured signal from the sensor, and configured to generate and transmit an output signal, based at least partially on the measured signal and a target ORP value in a range of from about 200 mV to about 1,000 mV, to the biocide source to regulate a rate of introduction of the biocide into the ballast water. In some cases, the biocide source can comprise an electrolyzer configured to generate a halogen-based biocide. In other cases, the electrolyzer can comprises an inlet fluidly connected to the source of ballast water, seawater, water containing a chloride species or combinations thereof, and can be configured to generate a hypochlorite compound. The electrolyzer can comprise a first outlet that is fluidly connected to an outlet of the source of ballast water, seawater, water containing a chloride species or combinations thereof at point downstream thereof and upstream of the inlet of the electrolyzer. In some cases, the electrolyzer can comprise a second outlet that is fluidly connected upstream of the ballast tank inlet and downstream of the electrolyzer inlet. The electrolyzer is typically configured to generate a hypochlorite compound and an oxygenated species. In some cases, the output signal typically regulates an electrical current density through the electrolyzer of at least about 1,000 Amp/m$^2$. In still further embodiments of the shipboard water treatment system, the target ORP value is in a range of from about 500 mV to about 750 mV. Further, the target ORP value can be based on a mandated or regulated disinfection requirement. The controller can also be configured to regulate a rate of introduction of the biocide into the sea chest to achieve a target biofouling control value in water introduced into the shipboard cooling system. The shipboard water can further comprise a degassing tank fluidly connected downstream of the electrolyzer. The source of ballast water, seawater, water containing a chloride species or combinations thereof can be a sea chest which can be fluidly connected to a shipboard cooling water system.

One or more aspects of the invention can be directed to a method of treating water to be introduced into a ballast tank. In some embodiments thereof, the method of treating water to be introduced into the ballast tank can comprise introducing a biocide into the water; and regulating a rate of introduction of the biocide to achieve a target water oxidation reduction potential value in a range of from about 200 mV to about 1,000 mV in the water. Introducing the biocide can comprise an act of generating a biocide stream comprising at least one halogenated species. Regulating the rate of introduction of the biocide can comprise one or more acts of regulating an operating parameter of a biocide generator to achieve a target water oxidation reduction potential value in a range of from about 500 mV to about 750 mV. The method of treating water to be introduced into the ballast tank can further comprise one or more acts of introducing a portion of the biocide stream into a source of the water. The method of treating water to be introduced into the ballast tank can further comprise regulating a rate of addition of the biocide into the source of the water to achieve a desired biofouling-control concentration of the biocide. In some advantageous embodiments, the method of treating water can comprise electrolyzing a portion of the water from the source of the water in an electrolyzer to generate a biocide stream. Electrolyzing a portion of the water from the source can comprise one or more acts of generating the biocide stream comprising a hypochlorite and, in some cases, a biocide stream containing a hypochlorite and an oxygenated species. The source of the water may comprise a sea chest fluidly connected to a shipboard cooling system.

One or more aspects of the invention can be directed to a method of modifying a ballast water system having a ballast tank connected to a source of seawater. In some embodiments thereof, the method of modifying the ballast water system can comprise connecting an inlet of an electrolyzer to the source of seawater, connecting an outlet of the electrolyzer outlet to an inlet of a degassing tank, and connecting a controller to the electrolyzer and to an oxidation reduction potential sensor disposed downstream of an outlet of the degassing tank. The controller is preferably configured to regulate an operating parameter of the electrolyzer to achieve a target oxidation reduction potential value in a range of from about 200 mV to about 1,000 mV in the seawater to be introduced into the ballast tank. The target oxidation reduction potential value may be in a range of from about 500 mV to about 750 mV. The method of modifying the ballast water system can further comprise connecting the degassing tank outlet to an inlet of the ballast tank. Further, the method of modifying the ballast water system can comprise connecting the degassing tank outlet to the source of seawater. The method can comprise disposing the oxidation reduction potential sensor upstream of a filter connected between the source of the seawater and the ballast tank. The source or seawater can comprise a seachest or reservoir which advantageously store chloride containing water. The shipboard water treatment system can have a target oxidation reduction potential value is in a range of 650 ppm to 750 ppm. The sensor can comprise a gold-tip electrode. The shipboard water treatment system may further comprise a second sensor disposed to measure at least one of a free chlorine concentration and an oxidation reduction potential of water in the ballast tank. The shipboard water treatment system can have a second sensor disposed to measure and transmit a second measured signal representative of at least one of a free chlorine concentration, total chlorine concentration, and an oxidation reduction potential value of water to be discharged from the ballast tank. The shipboard water treatment system can comprise a controller further configured to receive the second measured signal, and to generate a second output signal based at least partially on the second measured signal and at least one of a target free chlorine concentration, a target total chlorine concentration, and a second target oxidation reduction potential value. The second target oxidation reduction potential value can be in a range of from 200 mV to 500 mV.

One or more aspects of the invention can be directed to a shipboard water treatment system on a ship in a body of water. The treatment system can comprise a source of water containing at least one chloride species, a filter fluidly connected to at least one of the source and the body of water, a ballast tank fluidly connected downstream from the filter, a sensor disposed to measure and transmit a measured signal representative of an oxidation reduction potential of the seawater, a biocide source disposed to introduce a biocide into the ballast tank, and a controller disposed to receive the measured signal from the sensor, and configured to generate and transmit an output signal, based at least partially on the measured signal and a target oxidation reduction potential value in a range of from about 200 mV to about 1,000 mV, to the biocide source to regulate a rate of introduction of the biocide into at least one of the ballast tank and into water to be introduced into the filter.

Further embodiments directed to shipboard water treatment systems can comprise a source of seawater, water containing chloride species, or mixtures thereof, which can be a storage vessel utilized to store the seawater, water containing chloride species or mixtures thereof, when the ship is not in seawater. Thus, for example, seawater can be accumulated and stored in one or more reservoirs and utilized by one or more biocide sources described herein, when the ship is transiting through fresh water bodies. Indeed, in some embodiments, a ship having two or more ballast tanks can utilize any of the ballast tanks to store seawater and subsequently utilize at least a portion of the stored seawater as the source of chloride containing water for the biocide source.

One or more aspects of the invention provide biofouling control of ship water systems. For example, electrocatalytically generated agents utilized in disinfection can also be used to inhibit biofouling of a ship's cooling system, typically at oxidizer concentrations that are less than those utilized in disinfection.

Chlorine demand can be related to the presence of inorganic and organic compounds that react with chlorine. Until the chlorine demand is met, there will likely be no free chlorine available for disinfection. If nitrogen compounds are present, chloramines can be formed, which are considered to be weaker biocides than free chlorine. Chlorine dose (CD) is typically dependent on a total residual chlorine (TRC) and chlorine demand (Demand$_{chlorine}$) as represented by the relationship (1).

$$TRC = Dose_{chlorine} - Demand_{chlorine} \tag{1}$$

The total residual chlorine can be represented by the relationship (2).

$$TRC = [chloramine] + [free\ chlorine] \tag{2}$$

When present, free chlorine, such as HOCl, typically dissociates in accordance with the relationship (3).

$$HOCl \rightarrow H^+ + OCl^- \tag{3}$$

Hypochlorous acid (HOCl) is a preferred biocide. The use of TRC for characterizing effectiveness of the chlorine treatment, however, cannot provide an accurate prediction of the disinfection effectiveness, especially for treating ballast water pumped onboard a ship from polluted port harbors because variabilities in chloramine concentrations can create a range of effective TRC, from as low as below five ppm to as high as 40 ppm. If an excess of free chlorine is used to accommodate the demand variabilities, undesirable corrosion risks, such as corrosion of the ship steel structures, result as well as the formation of potentially toxic disinfection byproducts, such as trihalomethanes (THM), which typically depends on chlorine demand and levels of free available chlorine.

The present invention thus provides systems and techniques that provide reliable control of biocide addition or introduction at a level that result in effective disinfection of, for example, ballast water. Indeed, some aspects of the invention provide systems and techniques that reduce the likelihood of over-chlorination. Still further aspects of the invention can involve systems and techniques that allow selection, monitoring of, and regulating to an effective biocide dose that would minimize or reduce the likelihood corrosion and byproduct generation. Preferred aspects of the invention provide effective disinfection of ballast water in any port independent of the local seawater conditions such as chlorine demand, pollution level, and pH, which can be ensured by utilizing aspects of the disclosure that maintain a sufficient biocide oxidizing strength, as represented by a measured ORP or redox potential.

At least one ORP probe or sensor configured to measure an oxidation reduction or redox potential of the water can be utilized in one or more embodiments of the invention. The measured potential may be defined by the most active oxidizing or reducing agent in water, which in some aspects of the invention, would typically be HOCl. Because, however, seawater typically comprises about 50 ppm to about 60 ppm sodium bromide, seawater disinfection utilizing chlorine may be at least partially be effected through a brominated species, e.g., hypobromous acid, converted according to equation (4).

$$HOCl + NaBr \rightarrow NaCl + HOBr \tag{4}$$

The redox potential $E_h$ for a specific application is typically based on the Nernst equation (5).

$$E_h = E^0 + \frac{RT}{nF} \log\left(\frac{A_{ox}}{A_{red}}\right) \tag{5}$$

where $E_h$ is the redox potential of the reaction, $E^o$ is the standard potential, RT/nF is the Nernst number, $A_{ox}$ represents the activity of the oxidant, and $A_{red}$ represents the activity of the reductant.

Chlorine typically has a standard potential of 1490 mV and bromine typically has a standard potential of 1330 mV. At a typical pH of seawater within a range of 7 to 8.4, the concentration of HOBr is more stable than the concentration of HOCl. For example, at a pH of 8.0 the non-dissociated HOBr species is at about 83% whereas the HOCl species is at about 28%. Thus, it is believed that the ORP level required for disinfection of seawater by chlorine may be different than the one established for freshwater.

Establishing a desired or target redox potential value for treating seawater, such as for ballast water treatment may be advantageous to facilitate maintaining a chlorine concentration at a level that provides disinfection or biofouling control while providing a low potential for corrosion of piping and other wetted hull structures. It is believed that for continuous chlorination, chlorine level can be maintained in a range at below about 0.5 ppm to 1.0 ppm, and preferably within a range of from 0.1 ppm to 0.2 ppm. Thus, in some embodiments, the upper limit of the target ORP value may be determined so as to provide a corresponding chlorine level of about 1 ppm, or to provide conditions that do not exceed acceptable corrosion rates. Empirical information may be utilized to at least partially establish a relationship between ORP level and measured corrosion rates. For example, a steel corrosion rate of 1 mil per year may be used as an acceptable guideline to at least partially define the upper limit of the target ORP value. The lower limit of the target ORP value may be determined to be at conditions that sufficiently provide desired inactivation effect. For example, empirical information can be used to establish a relationship between ORP level and inactivation efficiency.

Figure 3:
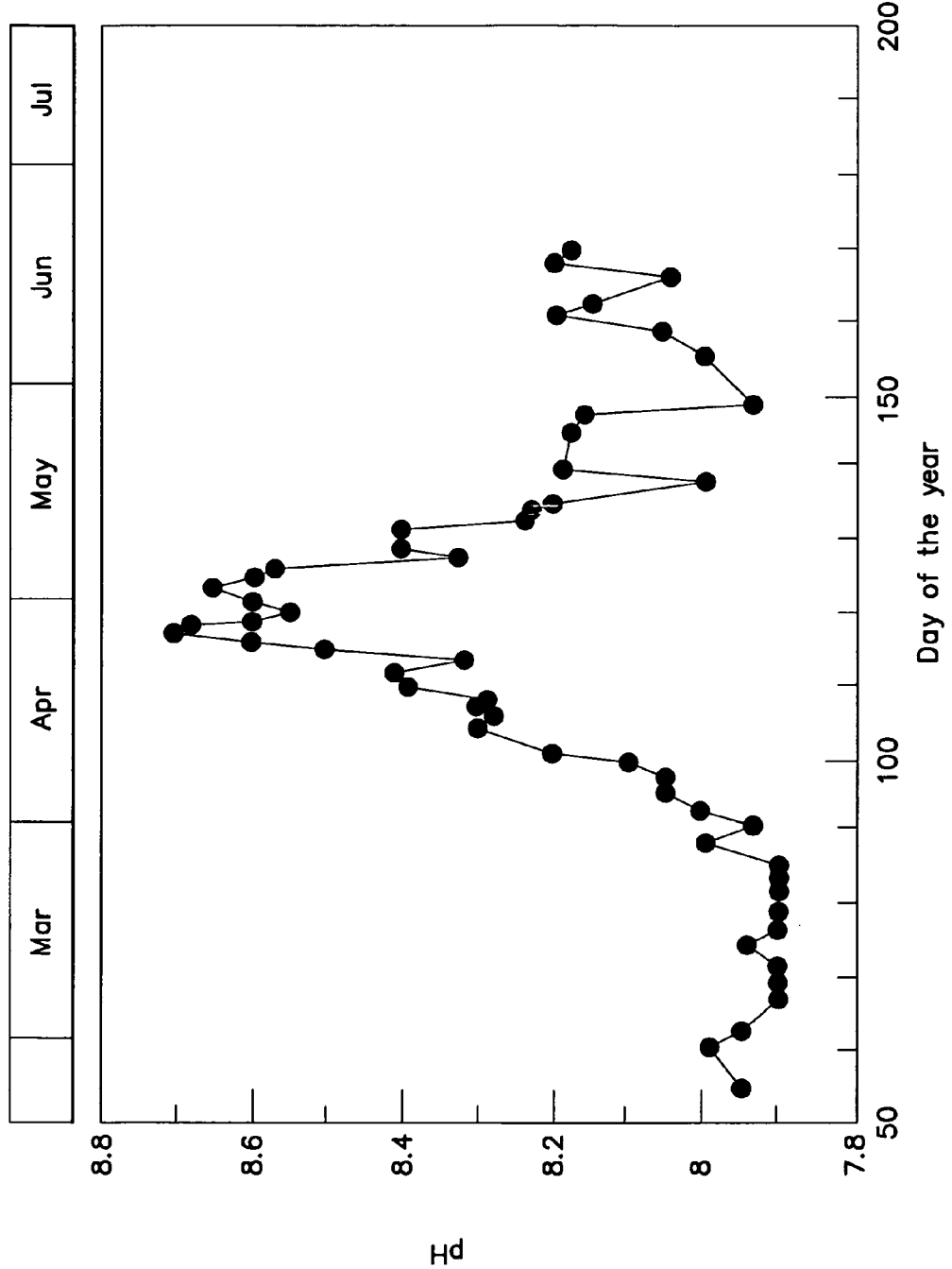
FIG. 3 is a graph illustrating the pH of seawater in the North Sea, off the coast of Texel Island, the Netherlands over a portion of a year.
Figure 4:
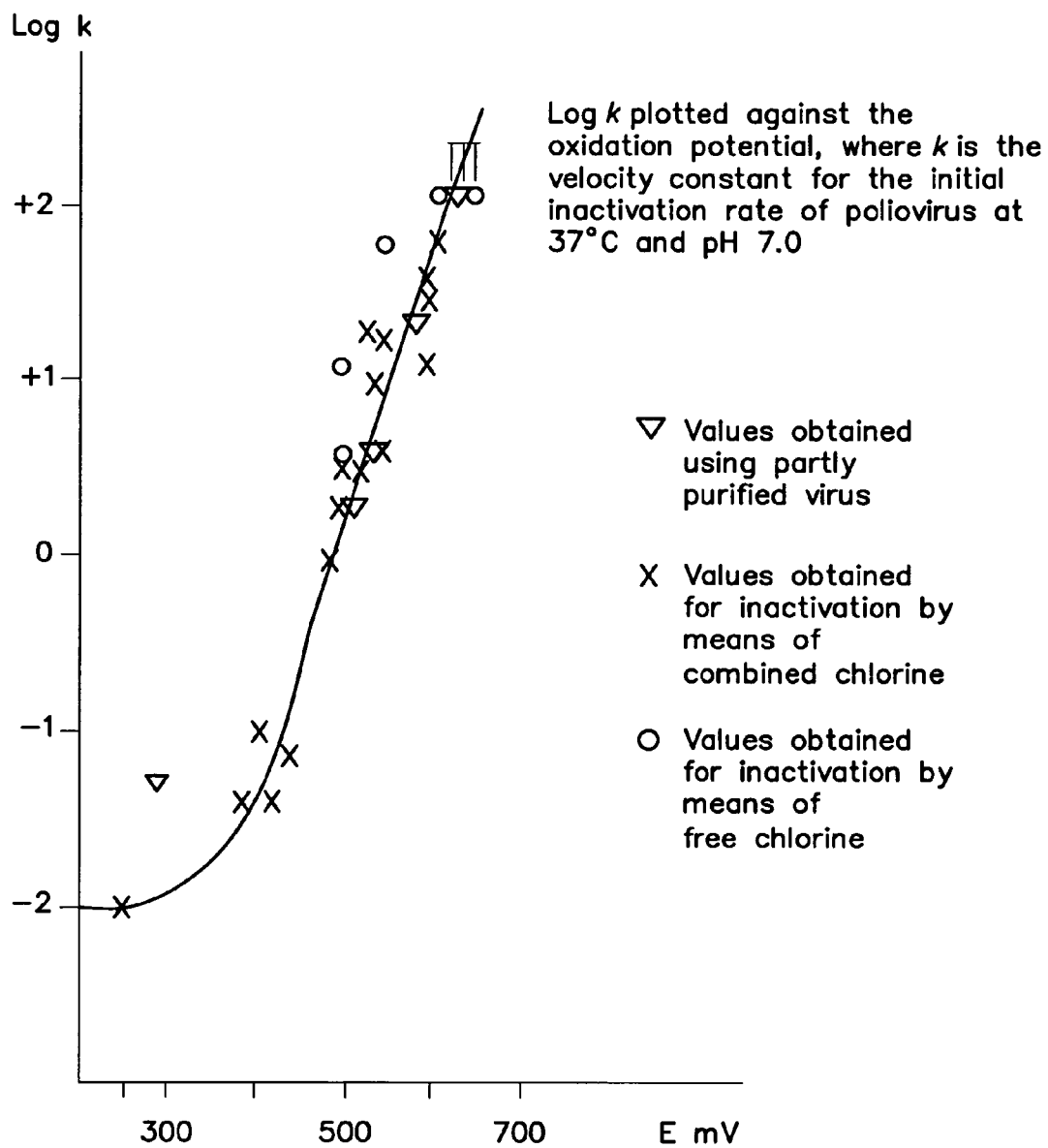
FIG. 4 is a graph illustrating the inactivation rate of Poliovirus versus oxidation potential.

Factors that can affect the germicidal efficacy of free chlorine residual techniques include the chlorine residual concentration, contact time, pH, and water temperature. pH may also vary from port to port or from season to season. For example, a high seawater pH can result from the seasonal algae bloom. FIG. 3 shows seasonal variations in pH values in the North Sea off the Texel Island, the Netherlands (also provided by NIOZ). Because fixed chlorine output-based treatments system are typically designed to meet the worst case scenario, i.e., at high pH, over-chlorination of ballast water can result under conditions of a lower seawater pH, with associated increased corrosion potential and increased likelihood of DBP formation.

Unlike residual chlorine analyzers that measure chlorine concentration and not its disinfection strength, ORP sensors provide a qualitative representation of the oxidizing (electron consuming) potential or reducing (electron supplying) potential of water being treated.

The features of ORP control for water sanitation was noted by Ebba Lund in 1963 in authored a paper containing the graph reproduced in HG. 4. This graph shows that the inactivation rate of Poliovirus is directly related to the oxidation potential of the water in which it resides. It also illustrates that inactivation rates are independent of the species of chlorine used (i.e. free vs. combined chlorine). As ORP rises, the rate of inactivation rises. Studies conducted later on organisms such as *E-coli, Salmonella and Cryptosporidium*, resulted in similar findings.

Further observation from the experimental data shows that when the amount of reductants is constant, the redox potential and the residual chlorine concentration may both be used as parameters for the rate of inactivation, but when the amount of reductants is changed then only redox potential may still be used.

The water treatment process of the invention is typically performed with a batch of seawater which can be used as ballast water. In such cases, the oxidizer concentration, such as chlorine, typically decreases over time because the oxidizer reacts with inorganic, organic, and biologic matter. The present invention, in some aspects, provides control of the treated water ORP potential based on a dynamic of concentration in the water being treated. Thus, the ORP control is typically devised to provide time for a biocide to be effective in inactivating at least a portion, or preferably, substantially all, ANS, e.g., with a time delay loop, while minimizing potential harm of corrosion to the ship structure and formation of DBP.

Figure 5:
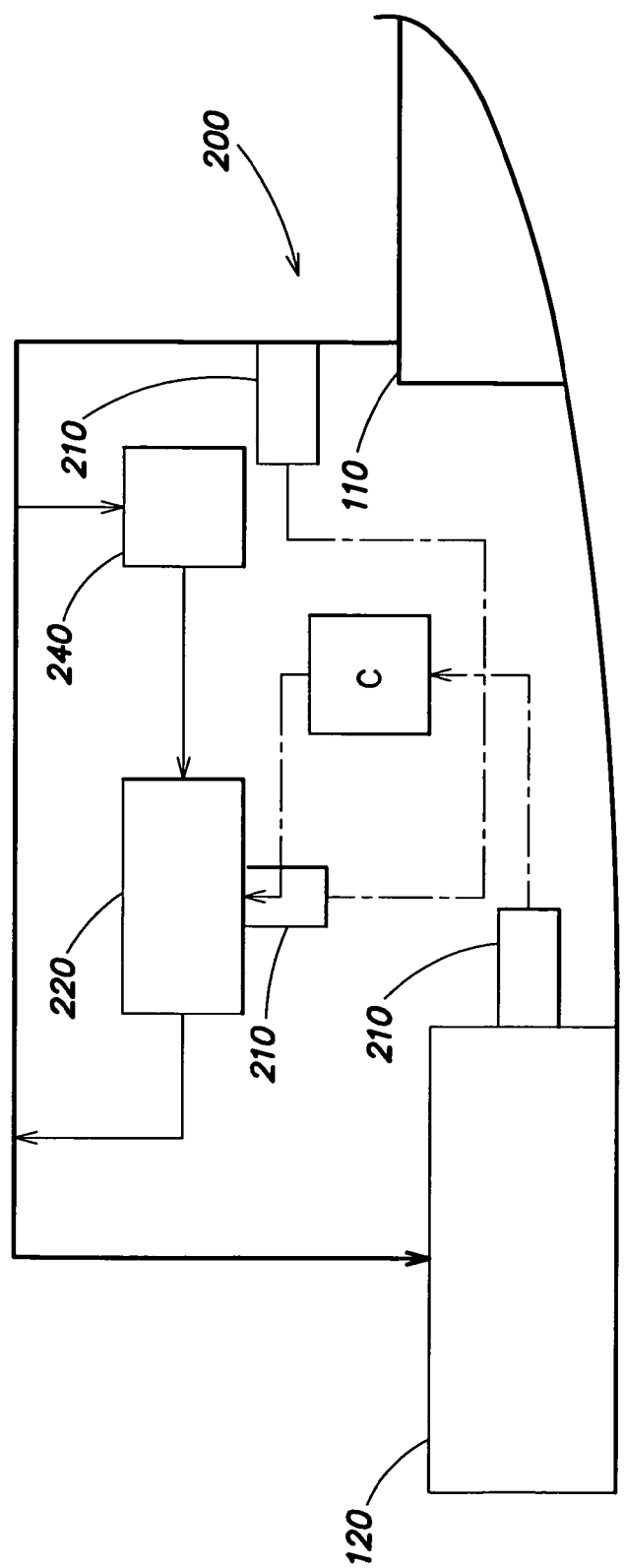
FIG. 5 is a schematic illustration of a biocide generation and monitoring system in accordance with some aspects of the invention.

FIG. 5 schematically illustrates a shipboard treatment system 200 in accordance with at least one aspect of the invention. Treatment system 200 can comprise a source of seawater, such as a sea chest 110 fluidly connected to at least one ballast tank 120. Treatment system 200 can be directed to a water treatment system that is based on chlorine disinfection with the chlorine dose level being controlled by the redox potential of the treated water. For example, treatment system 200 can comprise an ORP controlled system that provides a variable chlorine dose level while maintaining a target or desired redox potential of treated seawater at a level that provides an effective mortality rate of the ANS. In some particular aspects of the invention, treatment system 200 can provide or, preferably, maintain a residual hypochlorous acid (HOCl) concentration at a level sufficient to provide disinfection of the treated seawater, independent of the quality of the water being treated. For example, treatment system 200 can obviate the need to compensate for the pH or contamination levels, or both, of the water to be treated. Some particular embodiments related to such aspects can be effected by, for example, implementing or controlling a rate of introduction of at least one biocidal agent to provide a desired or target ORP value in a range of from about 200 mV to about 1,000 mV. Preferably the target ORP value is in a range of from 650 mV to 800 mV, more preferably, from 650 mV to 750 mV. To facilitate such disinfection treatment, system 200 can comprise at least one probe or sensor 210, disposed to provide a measured characteristic of the water introduced into ballast tank 120, at least one controller or control system C disposed to receive a measured signal representative of the measured characteristic from probe or sensor 210. As noted, preferred, non-limiting embodiments involve sensors or probes that can provide a representation of an ORP level of the water. Treatment system 200 can further comprise at least one source 220 of at least one disinfecting agent or biocidal agent, disposed to introduce at least one biocidal agent into the water. For example, a chlorine supply system can be utilized to provide at least one disinfecting species into the water introduced into tank 120. As schematically illustrated, a control feedback loop can be established to regulate the introduction of the agent into the water to be treated. The at least one ORP probe can be directly inserted into the water piping or, for ease of maintenance, be installed in a circulating loop. In other cases, the ORP monitoring and control system can comprise a pump 240 which withdraws a side stream from the ballast water main supply 110. It is preferred that the pipes and flanges connecting the ORP probe with the main be constructed of the same material as the main line to prevent stray current that may harm the ORP probe or provide undesirable galvanic corrosion conditions. Preferably, the at least one probe has the same potential as the main line which can be effected by grounding the probe to the main.

Other aspects of the invention can involve ORP-based control systems and techniques as well as neutralization subsystems and methods that remove or reduce residual chlorine concentrations in the treated water, such as ballast water, before being discharged during a de-ballasting operation. Preferred aspects, however, provide or facilitate elimination of an undesirable discharge of residual chlorine and particularly desirable aspects of the invention can provide treatment systems without dechlorination subsystems. Dechlorination can utilize, for example, at least one reducing agent such as, but not limited to, sodium bisulfite, hydrogen peroxide, and ferrous salts. Neutralization of chlorine can be accomplished by setting the ORP controller within a range of 150 mV-350 mV, preferably within a range of 200 mV-300 mV, which is typical for untreated seawater. Other neutralizing techniques can utilize any of activated carbon, ultraviolet based systems, and metal catalyzed stationary beds.

As an option, the same ORP control equipment can be used for both ballasting and de-ballasting operations, with an appropriate change of the ORP settings. For example, ballast water, seawater, water containing a chloride species or combinations thereof, can be introduced from sea chest 110 into tank 120 so that the resultant ORP value of water in the tank has an ORP value that is less than or at about a desired or acceptable level, e.g., at 300 mV, or even less than 100 mV.

Figure 6:
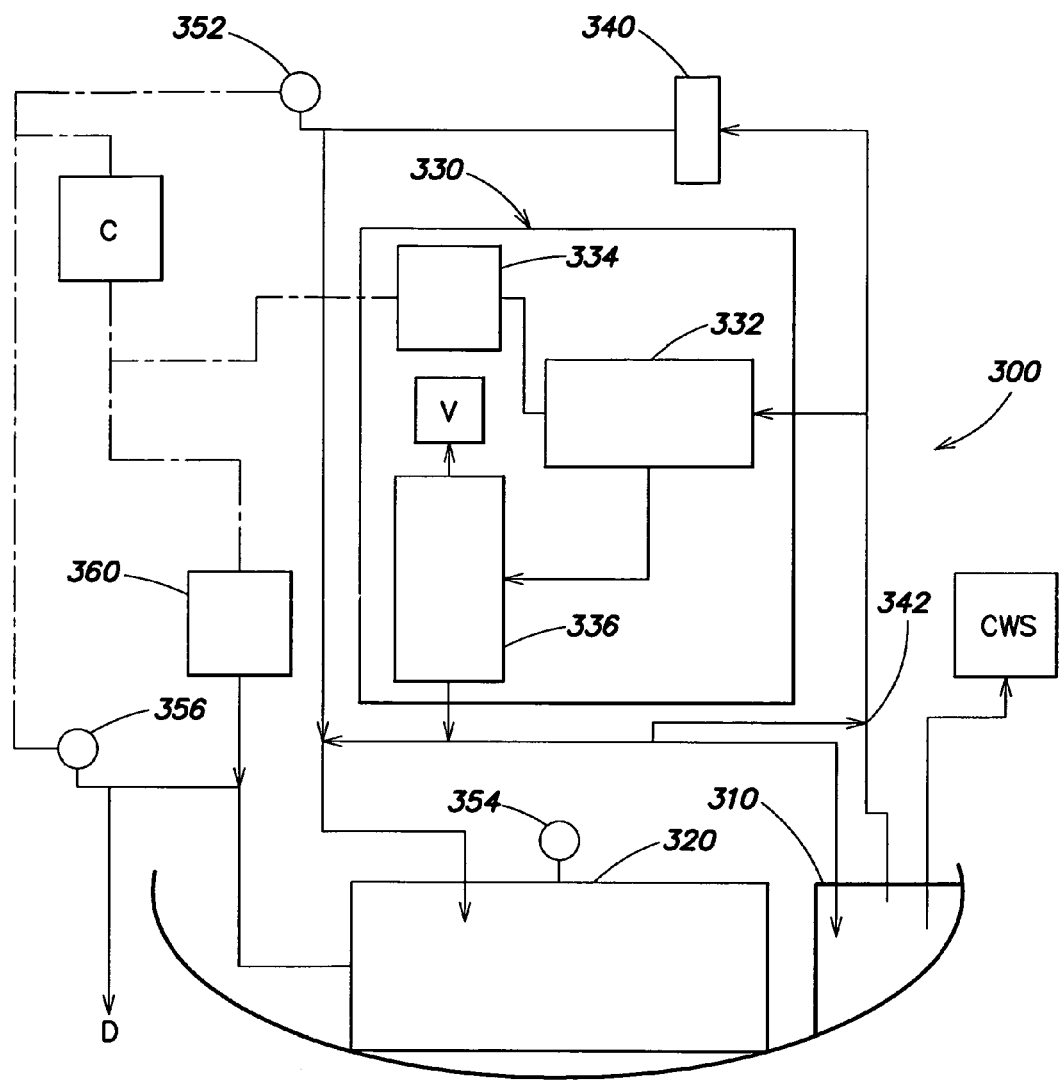
FIG. 6 is a schematic illustration of a shipboard disinfection system in accordance with some aspects of the invention.

Another schematic illustration of a treatment system 300 in accordance with some aspects of the invention is presented at FIG. 6. System 300 can comprise a source of seawater such as sea chest 310 disposed in a ship. System 300 can further comprise or be fluidly connected to a buoyancy system typically comprising at least one ballast water tank 320. In particular embodiments, system 300 can comprise at least one source 330 of an oxidizer or biocidal agent fluidly connected to sea chest 310, and preferably to at least one ballast tank 320. In still other embodiments, sea chest 310 is fluidly connected to at least one system of the ship that utilizes seawater. For example, sea chest 310 can be fluidly connected to and provide seawater to at least one cooling water system CWS of the ship. Source 330 can comprise at least one electrically driven apparatus such as an electrolyzer 332 that can electrochemically convert a precursor species into at least one disinfecting or biocide compound. Source 330 can further comprise at least one power supply 334, disposed to provide electrical energy to apparatus 332 to promote electrocatalytic conversion of chloride containing water supplied from sea chest 310 into the biocidal agent. Source 330 can further comprise at least one degassing unit operation 336 that facilitates removal of any gas, such as hydrogen gas, by way of at least one vent V, generated during the electrocatalytic biocidal agent generation process. At least one outlet of source 330 can be connected to tank 320. Preferably, an outlet of degassing unit operation 336 is fluidly connected to tank 320. In preferred embodiments, an outlet of source 330 is further connected to sea chest 310 to provide at least one biocide-containing stream from any of electrolyzer 332 and degassing unit operation 326. As schematically illustrated in FIG. 6, system 300 can utilize side stream withdrawal techniques wherein a portion of the seawater withdrawn from sea chest 310 is introduced into source 330 and a balance of the seawater to be introduced into ship buoyancy system 320 is filtered through at least one filter 340.

Oxidizer source 330 can comprise at least one electrically driven apparatus that generates at least one oxidizing species, such as, but not limited to, electrolyzer 332. System 300 can further comprise a monitoring system including at least one sensor or probe disposed to provide a representation of at least one characteristic or property of at least one component of system 300. As exemplarily illustrated, the monitoring system comprises at least one sensor 352 disposed to measure at least one property of water from sea chest 310 in a main piping line 342, at least one sensor 354 disposed to measure at least one property of buoyancy system 320, such as a characteristic of water in one or more ballast tanks of the buoyancy system, and, optionally, at least one sensor 356 disposed to measure a property of water to be discharged to outlet or discharge D from one or more ballast tanks. System 300 can further comprise at least one controller or control system C. Control system C is preferably configured to regulate or adjust at least one operating parameter of system 300. In particular aspects of the invention, control system C can receive at least one input signal from at least one sensor from the monitoring system. In further particular aspects of the invention, control system C can regulate at least one operating parameter of any of source 330 and the buoyancy system. In still other particular aspects, control system C can also monitor and control water discharging operations from ballast tank 320.

During buoyancy-adjusting operations, including but not limited to ballasting, an oxidizer or biocide containing stream, such as chlorine from source 330 can be introduced into sea chest 310 as well as main ballast water piping 342 through one or more chlorine distribution devices. The redox potential of the chlorinated water in main piping 342 can be monitored by the monitoring system comprising sensor 352 which can be an ORP sensor. Although sensor 352 is illustrated as being disposed downstream of filter 340, other embodiments may involve sensor 352 disposed upstream of filter 340 or even additional sensors upstream of filter 340 or in sea chest 310 to provide an indication or representation of a characteristic of the seawater. Control system C can be configured to receive one or more indications or representations from the monitoring system and accordingly adjust at least one operating parameter of the system such as an operating parameter of source 330, preferably based on the at least one representation. For example, control system C can be configured to maintain a treated water redox potential in any of the unit operations of system 300 to within preset, acceptable, or desirable water discharge limits. Optionally, during discharging or de-ballasting operations, at least one reducing or neutralizing agent can be introduced into the discharged treated ballast water from, for example, a reducing or neutralizing agent source. In particular embodiments, ORP sensor 356 can measure an ORP value or an oxidizer concentration of discharging water from the buoyancy system; and control system C can regulate an operating parameter of an oxidizer neutralizing system 360, such as a rate of addition or a dosing of the reducing agent that neutralizes, at least partially or to acceptable limits, any oxidizer or biocide in the discharging water, preferably based on the measurement signals from sensor 356. The desired discharge limits can be varied to satisfy jurisdictional mandates. For example, an acceptable chlorine level in discharge water can be less than about 1 mg/L, in some cases, less than about 0.5 mg/L, in some cases, less than 2 ppm.

Other ancillary unit operations may be utilized to facilitate operation of the treatment system. For example, if the source of chlorine involves in-situ electrochlorination, ancillary components or subsystems can include at least one booster pump that withdraws a side stream of seawater into the electrochemical generator 332, as well as at least one transformer rectifier that provides power to the generator. Further, blowers can be utilized to lower venting hydrogen gas levels to below explosive limits. Filter 340 can be a strainer that reduces organic and biological chlorine demand associated with sediments and biota. Preferably, filter 340 comprises a fine screen self-flushing strainer installed into the ballast water main pipe downstream of a ballast water pump (not shown). In preferred embodiments, the ORP-based disinfection system comprises a 50 micron or less, preferably a 40 micron, filter that reduces chlorine demand and further enhances chlorine disinfection effectiveness while reducing potential for corrosion and formation of DBPs. The filter may also remove zooplankton (organisms with a size of greater than 50 microns in at least one direction) from the incoming water. Removing zooplankton with a filter may facilitate effectively operating the treatment system at a lower target ORP level. In another embodiment, an impressed current system or a cathodic protection system is utilized to eliminate any stray current and voltages in any of the wetted components. The ORP sensors can be differential-types or have configurations that are similarly insensitive to stray currents. Further, any of the ORP sensors can have a working electrode with a gold or a platinum tip, that may be less sensitive to chemical contamination in seawater and to hydrogen. Commercially available ORP sensors include, but are not limited to those from Vernier Software & Technology, Beaverton, Oreg.; the Sensorex Corporation, Garden Grove, Calif., and Global Water Instrumentation, Inc., Gold River, Calif.

The electrochemical generator can have bipolar concentric tube electrodes. The positively charged electrodes can have a platinum coating and be operated at a current density exceeding 2,000 $A/m^2$, preferably within a range of 2,000 to 3,500 $A/m^2$, or under conditions that favor producing mixed oxidant solutions from seawater. Non-limiting examples of generators include those commercially available as CHLOROPAC® electrolytic generators, from Siemens Water Technologies Corp., Union, N.J.

The mixed oxidant enriched stream being delivered by the dosing pumps into the ballast water piping can be split in at least two flow paths. One flow stream can deliver a oxidizer containing stream into the sea chest thereby feeding the ballast water pipe to inhibit biofouling in the ballast water pipe and the strainer; this side stream can be designed to provide a fixed chlorine dose in a range of about 0.4-0.6 mg/L of chlorine, or a dose that is typically utilized for biofouling protection. The other stream can be delivered downstream of the strainer or filter. The side stream feeding the electrochemical generator can withdraw seawater from a cooling piping thereby accommodating utilization of the treatment system for biofouling control of the cooling seawater when ship is not conducting ballasting operations.

Other embodiments can involve one or more stored oxidizing species in source 330, which may comprise one or more storage tanks (not shown).

Figure 13:
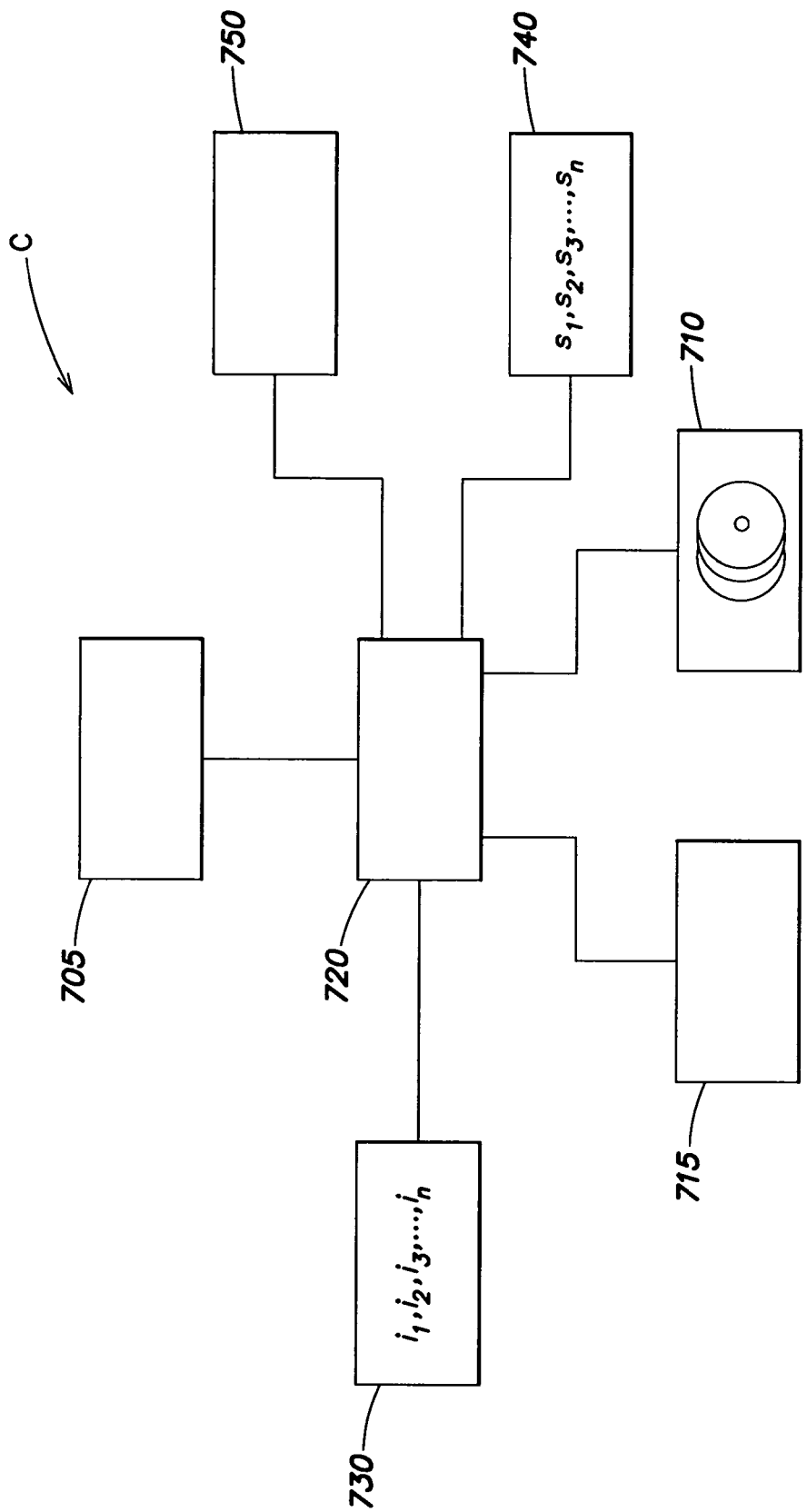
FIG. 13 is a schematic illustration of a control system that may be utilized to implement some aspects of the invention.

Control system C may be implemented using one or more computer systems as exemplarily shown in FIG. 13. Control system C may be, for example, a general-purpose computer such as those based on an Intel PENTIUM®-type processor, a Motorola PowerPC® processor, a Sun UltraSPARC® processor, a Hewlett-Packard PA-RISC® processor, or any other type of processor or combinations thereof. Alternatively, the computer system may include specially-programmed, special-purpose hardware, for example, an application-specific integrated circuit (ASIC) or controllers intended for analytical systems.

Control system C can include one or more processors 705 typically connected to one or more memory devices 710, which can comprise, for example, any one or more of a disk drive memory, a flash memory device, a RAM memory device, or other device for storing data. Memory 710 is typically used for storing programs and data during operation of the treatment system and/or control system C. For example, memory 710 may be used for storing historical data relating to the parameters over a period of time, as well as operating data. Software, including programming code that implements embodiments of the invention, can be stored on a computer readable and/or writeable nonvolatile recording medium, and then typically copied into memory wherein it can then be executed by the processor. Such programming code may be written in any of a plurality of programming languages, for example, Java, Visual Basic, C, C#, or C++, Fortran, Pascal, Eiffel, Basic, COBAL, or any of a variety of combinations thereof.

Components of the control system may be coupled by an interconnection mechanism 730, which may include one or more busses (e.g., between components that are integrated within a same device) and/or a network (e.g., between components that reside on separate discrete devices). The interconnection mechanism typically enables communications (e.g., data, instructions) to be exchanged between components of the system.

The control system can also include one or more input devices 730, for example, any of the sensor of the monitoring system, a keyboard, mouse, trackball, microphone, touch screen, that provide input signals $i_1, i_2, i_3, \ldots, i_n$, and one or more output devices 740, for example, a printing device, display screen, or speaker that can provide output signals $s_1, s_2, s_3, \ldots, s_i$. In addition, the computer system may contain one or more interfaces (not shown) that can connect the computer system to a communication network (in addition or as an alternative to the network that may be formed by one or more of the components of system).

According to one or more embodiments of the invention, the one or more input devices may include sensors for measuring parameters. Alternatively, the sensors, the metering valves and/or pumps, or all of these components may be connected to a communication network that is operatively coupled to computer system. For example, sensors 352, 354, and 356 may be configured as input devices that are directly connected to the computer system; and metering valves and/or pumps may be configured as output devices that are connected to the computer system, and any one or more of the above may be coupled to another computer system or component so as to communicate therewith over a communication network. Such a configuration permits one sensor to be located at a significant distance from another sensor or allow any sensor to be located at a significant distance from any subsystem and/or the controller, while still providing data therebetween.

Although the control system is shown by way of example as one type of computer system upon which various aspects of the invention may be practiced, it should be appreciated that the invention is not limited to being implemented in software, or on the computer system as exemplarily shown. Indeed, rather than implemented on, for example, a general purpose computer system, the controller, or components or subsections thereof, may alternatively be implemented as a dedicated system or as a dedicated programmable logic controller (PLC) or in a distributed control system. Further, it should be appreciated that one or more features or aspects of the invention may be implemented in software, hardware or firmware, or any combination thereof. For example, one or more segments of an algorithm executable by the controller can be performed in separate computers, which in turn, can be communication through one or more networks.

Co-pending U.S. patent applications 60/956,057, entitled "PROCESS FOR DISINFECTION OF BALLAST WATER," filed Aug. 15, 2007 and 61/043,795, entitled "METHOD AND SYSTEM FOR TREATING BALLAST WATER," filed Apr. 10, 2008, are incorporated herein by reference in their entirety for all purposes.

EXAMPLES

The function and advantages of these and other embodiments of the invention can be further understood from the examples below, which illustrate the benefits and/or advantages of the one or more systems and techniques of the invention but do not exemplify the full scope of the invention.

Example 1

Figure 7:
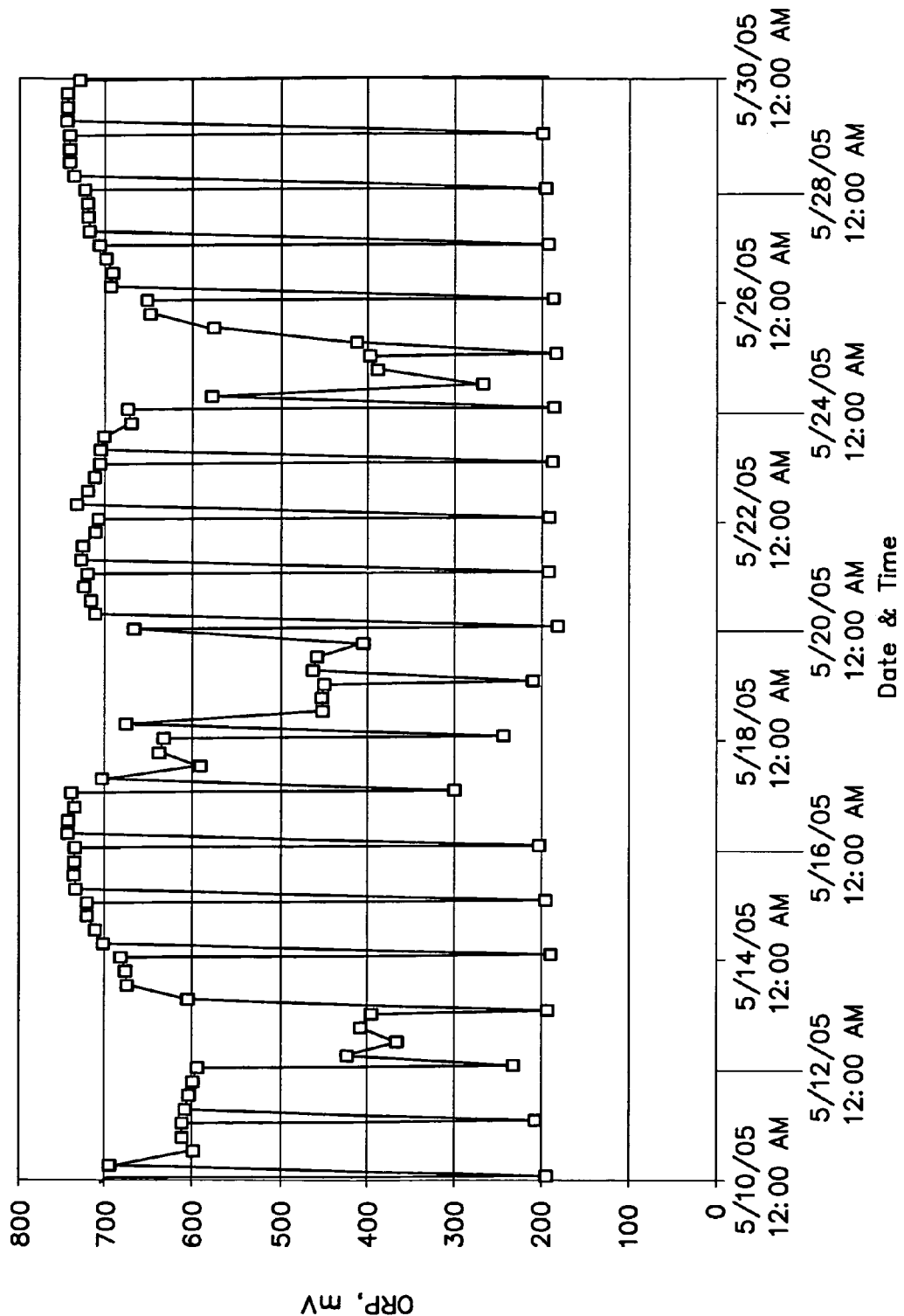
FIG. 7 is a graph of ORP readings in cooling water treated with chlorine recorded during a test aboard an oceangoing liquefied natural gas (LNG) carrier.

FIG. 7 presents a graph of ORP of cooling water discharged from an LNG carrier during the course of a 20 day observation period. The cooling water was treated with chlorine generated by a CHLOROPAC® electrolytic generator manufactured by Siemens Water Technologies Corp. The chlorine dose applied to the cooling water was set to be in a range of 0.6 mg/L. Every day at midnight the chlorine generation was interrupted for 2 hours to measure the ORP of the untreated water (ORP baseline).

During the observation period, the LNG carrier made several voyages lasting about five days each. The graph in FIG. 7 shows how the ORP values changed over time. The ORP values were observed to reach as high as about 725-750 mV when ship was at the open sea. The observed ORP was lower when the ship was either leaving or entering a harbor and was observed to drop to a level in a range of about 400-450 mV when the ship was at port. This difference in the ORP values, depending upon the location of the ship, reflect changes in chlorine demand and pollution level in the water surrounding ship in the different environments. For example, lower ORP values were observed for the constant chlorine dosage while the ship was in the waters of a port or a harbor, which can be more polluted compared to the open sea.

When the chlorine generator was inactive in the early morning hours, either at sea or in port, the observed ORP values stabilized at about 200 mV, which is a typical ORP potential of untreated fresh or seawater.

The example shows that at a low chlorine residual level in a range of 0.6 mg/L, the ORP value of treated water can be as high as 750 mV. Thus an effective disinfection ORP based approach can be achieved that involves relatively low free chlorine residual level.

Example 1 presents results of continuous chlorination of seawater. It should be understood that the water treatment process is typically performed in what is known as a batch mode, with chlorine concentration diminishing over time due to its reaction with inorganic, organic and biologic matter. Therefore, control of treated water ORP potential should take into account dynamics of chlorine concentration in the treated water. In other words, ORP-based control is preferably configured to provide enough time for a biocide to be effective in inactivating ANS, while minimizing potential harm of corrosion to the ship structures and formation of DBP.

Example 2

Figure 8:
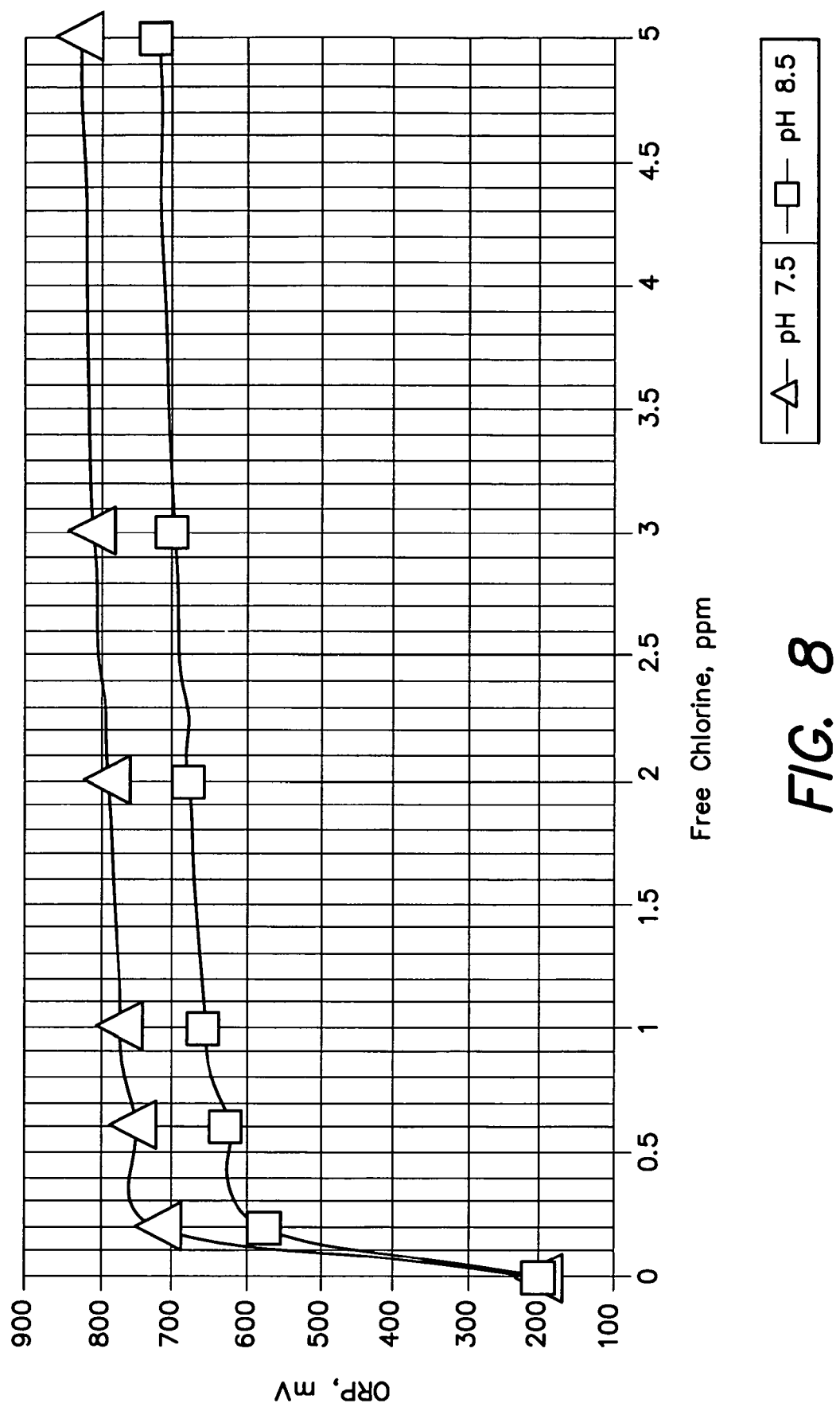
FIG. 8 is a graph illustrating a measured oxidation reduction potential relative to free chlorine concentration in a body of water, with a pH of 7.5 and with a pH of 8.5, that may be pertinent to some aspects of the invention.

FIG. 8 shows a chart depicting the relationship between ORP level and free chlorine concentration and pH of pool water. At a pH of about 7.5 units, an ORP potential of about 700 mV can be achieved with about 0.2 mg/L of free chlorine. The same potential at pH of 8.5 would require 3 ppm of free chlorine. FIG. 8 thus shows that without pH compensation, a treatment system based on free chlorine control would lead to unacceptable over-chlorination or under-chlorination conditions. Because fixed chlorine output-based treatments system are typically designed to meet the worst case scenario, i.e., at high pH, over-chlorination of ballast water can result, with associated increased corrosion potential and increased likelihood of DBP formation.

Example 3

An aqueous solution of sodium chloride (20 g/L) and sodium bromide (60 mg/L) with and without 2 mg/L of urea was prepared using tap water to simulate typical coastal seawater, with low and high nitrogen compound concentrations in a manner similar to the techniques used to evaluate water treatment systems described in a draft Environmental Technology Verification protocol by US EPA and US Coast Guard.

One liter of the prepared solution was placed in an amber glass beaker and continuously agitated. Chlorine was added to the beaker at increasing dose levels while monitoring the ORP of the treated solution and the residual free chlorine concentration.

Figure 9:
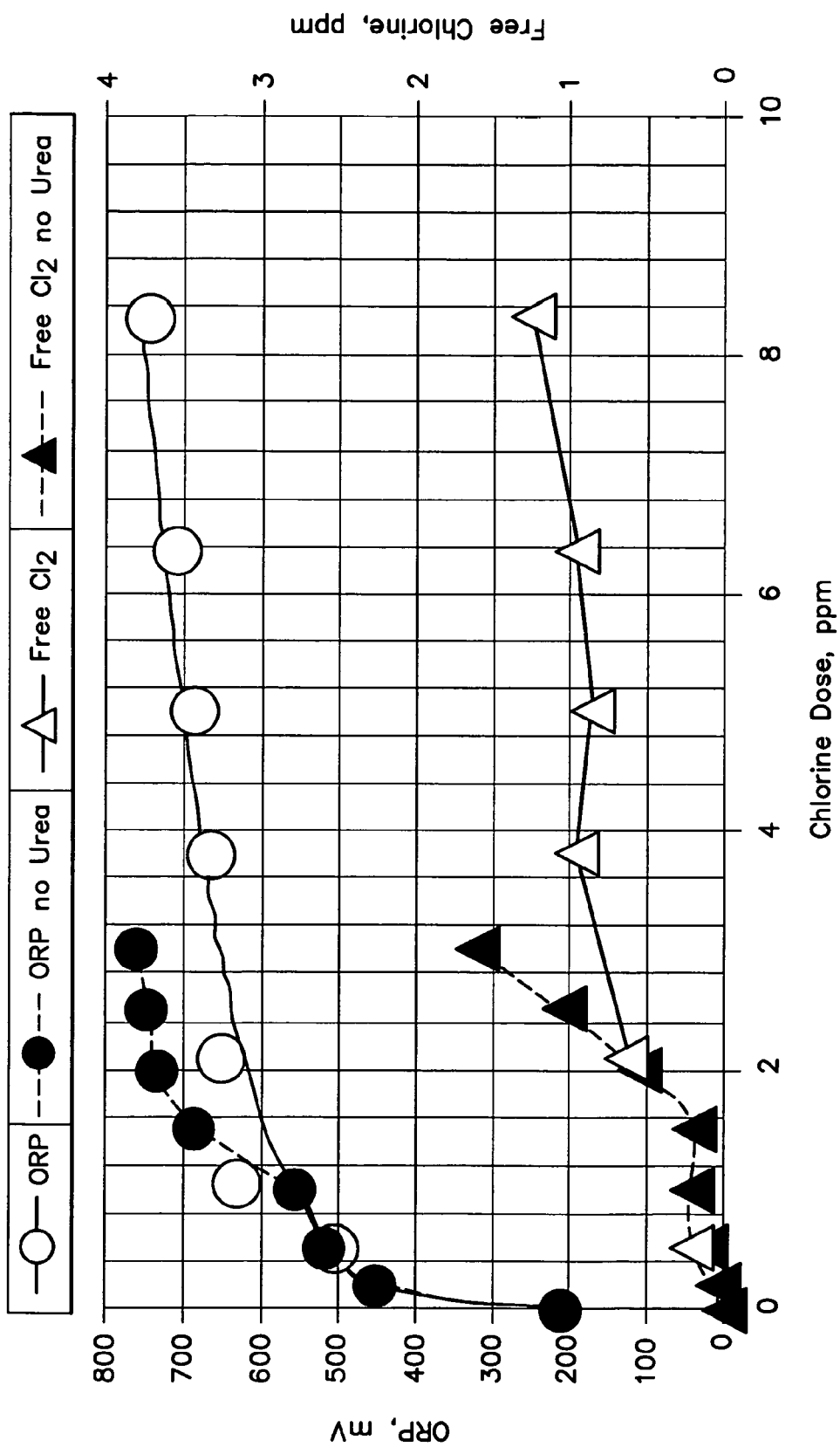
FIG. 9 is a graph illustrating a measured oxidation reduction potential and free chlorine concentration of chlorine in a water body relative to chlorine dosage that may be pertinent to some aspects of the invention.

The graph presented in FIG. 9 represents the dynamics of the free chlorine residual and of the redox potential in the simulated ballast water for two tests with no and 2 mg/L urea added.

The data shows that when no urea was added to the simulated ballast water, an ORP potential of 700 mV was reached at chlorine dose level of about 1.6 mg/L. When about 2 mg/L of urea was present in the simulated seawater, a chlorine does of 5.2 mg/L was required to reach the same potential.

A fixed chlorine output system would typically be designed for the worst case scenario (with high nitrogen compound levels). Thus, the same system, when in the port or in conditions with low chlorine demand, would create over-chlorination conditions, leading to undesirable corrosion conditions and DBP formation rates.

Example 4

An aqueous solution of sodium chloride (20 g/L) and sodium bromide (60 mg/L) with 1 mg/L of urea was prepared using tap water to simulate typical coastal seawater. One liter of the prepared solution was placed in an amber glass beaker and continuously agitated. Chlorine was added to the beaker at 0.5 mg/L while monitoring the solution's ORP and TRC and residual free chlorine levels. Residential combined chlorine concentration was calculated based on a difference between the TRC and a residential free chlorine concentration. Similar tests were performed using chlorine dose levels at 1.0 mg/L, 1.5 mg/L, 2.0 mg/L, and 3 mg/L.

Figure 10:
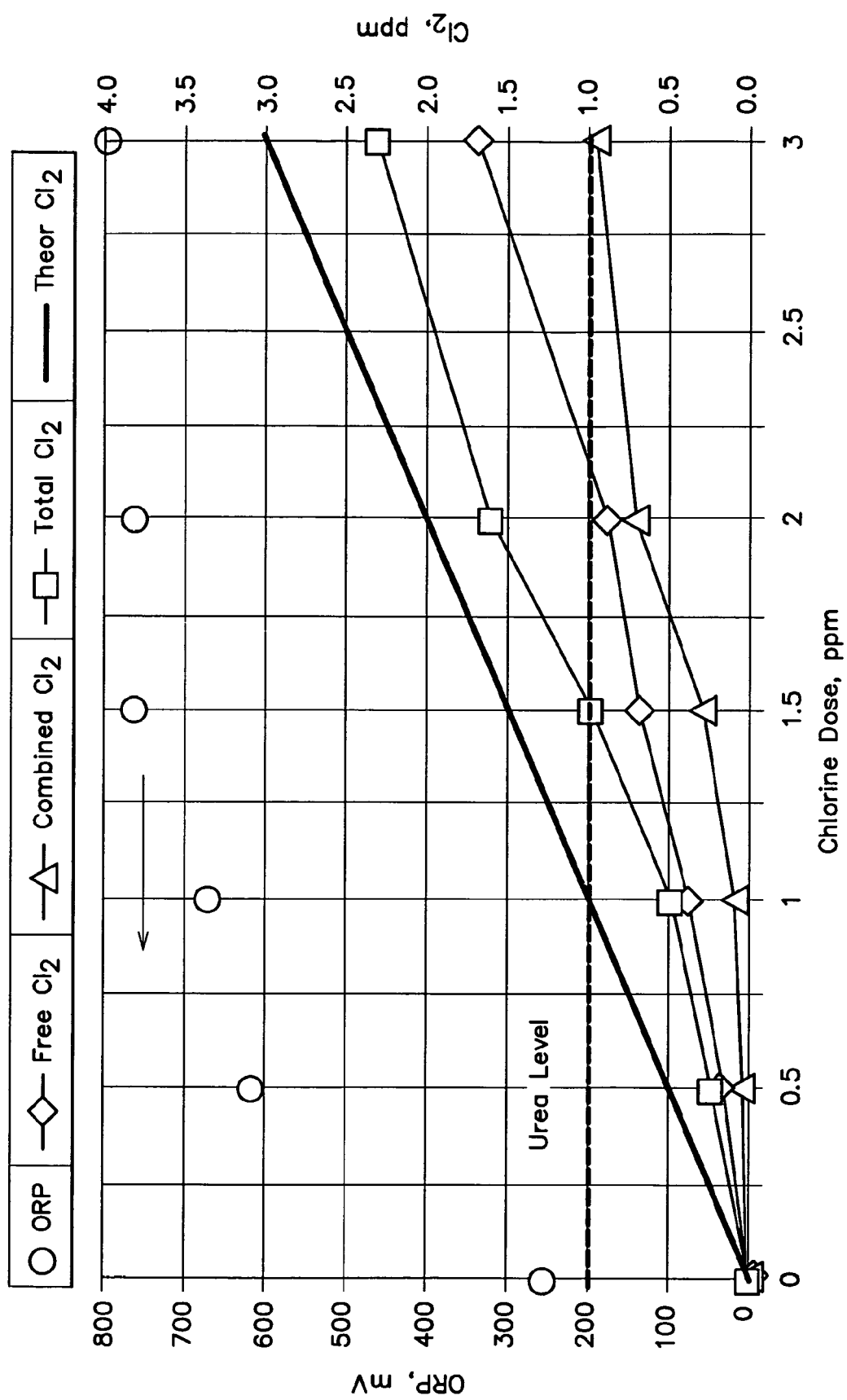
FIG. 10 is a graph illustrating a measured oxidation reduction potential and free chlorine concentration of chlorine in a water body relative to chlorine dosage that may be pertinent to some aspects of the invention.

ORP readings and concentration of total residual, free and combined chlorine for all these tests at 10 minutes after chlorine dosing are presented in FIG. 10. The data shows that in the presence of 1 mg/L of urea, an ORP level of about 700 mV can be reached to provide about 1.25 mg/L of chlorine, 10 minutes after dosing. At this dosing level, free chlorine concentration is about 0.5 mg/L, within conditions that do not promote steel corrosion. The combined chlorine concentration was found to be about 0.2 mg/L. At a dose level of 3 mg/L, however, free chlorine concentration was at about 1.5 mg/L, which may present corrosive conditions, and also was observed to result in a combined chlorine concentration of about 1 ppm, which is about five times the level compared to the observed combined chlorine level for a dose level of 1.25 mg/L. The results show the influence of chlorine dose.

Example 5

A seawater sample obtained from the North Sea off the coast of the Texel Island, the Netherlands in January, 2008 was filtered through a sand filter to remove suspended solids. Samples of the sea bottom sediments were also collected and thermally sanitized at about 60° C.

One liter samples were prepared: free of sediments, with about 100 mg/L of sediment, and with about 200 mg/L of sediment. Each sample was treated with chlorine to achieve about a 700 mV ORP value in the treated solution. In the sample free of sediment, an ORP value of about 700 mV was achieved by dosing with about 0.96 mg/L of chlorine. In the sample containing 100 mg/L of sediment an ORP value of about 700 mV was achieved by dosing with about 3.1 mg/L of chlorine. In the sample containing 200 mg/L of sediment, an ORP value of about 700 mV was achieved by dosing with about 4.2 mg/L of chlorine.

A similar test was performed with seawater from the same source collected in April, 2008 during the seasonal algae bloom. The seawater was filtered through a 50 micron nylon mesh filter. An ORP potential of 700 mV in a sediment free sample required dosing with about 2.5 mg/L of chlorine.

This example shows that the chlorine dose required to achieve an exemplary ORP value of 700 mV can be affected by several factors such as the total suspended solids (TSS) level and the seasonal change in chlorine demand.

Example 6

A seawater sample obtained from the North Sea off the coast of the Texel Island in January, 2008 was filtered through a sand filter to remove suspended solids. One liter samples were prepared and treated with chlorine doses of 10 mg/L, 5 mg/L, and with a chlorine dose sufficient to produce an ORP value of about 750 mV in the treated solution.

Figure 11A:
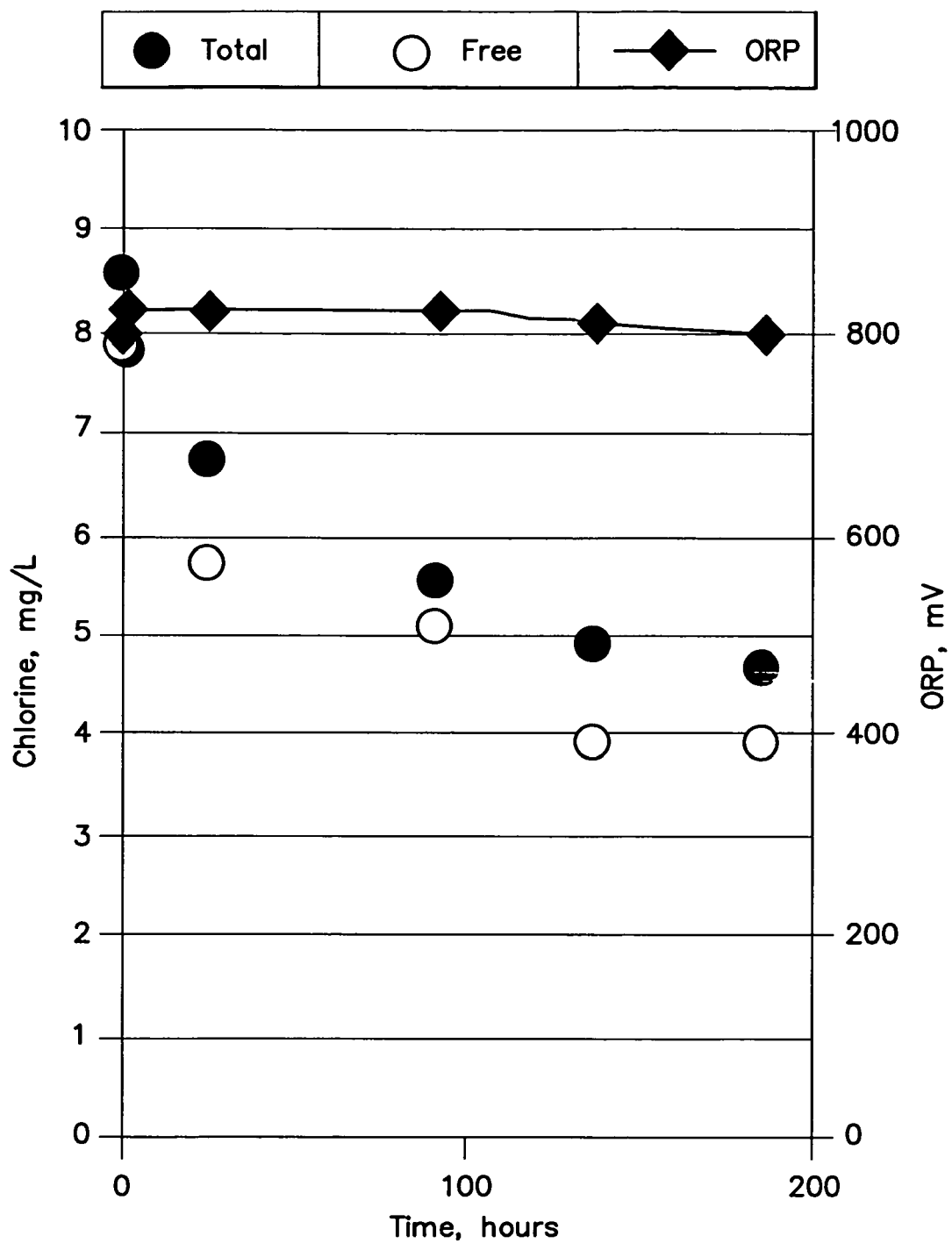
FIG. 11A is a graph illustrating the change in ORP and chlorine concentration over time in a seawater sample treated with 10 mg/L of chlorine.
Figure 11B:
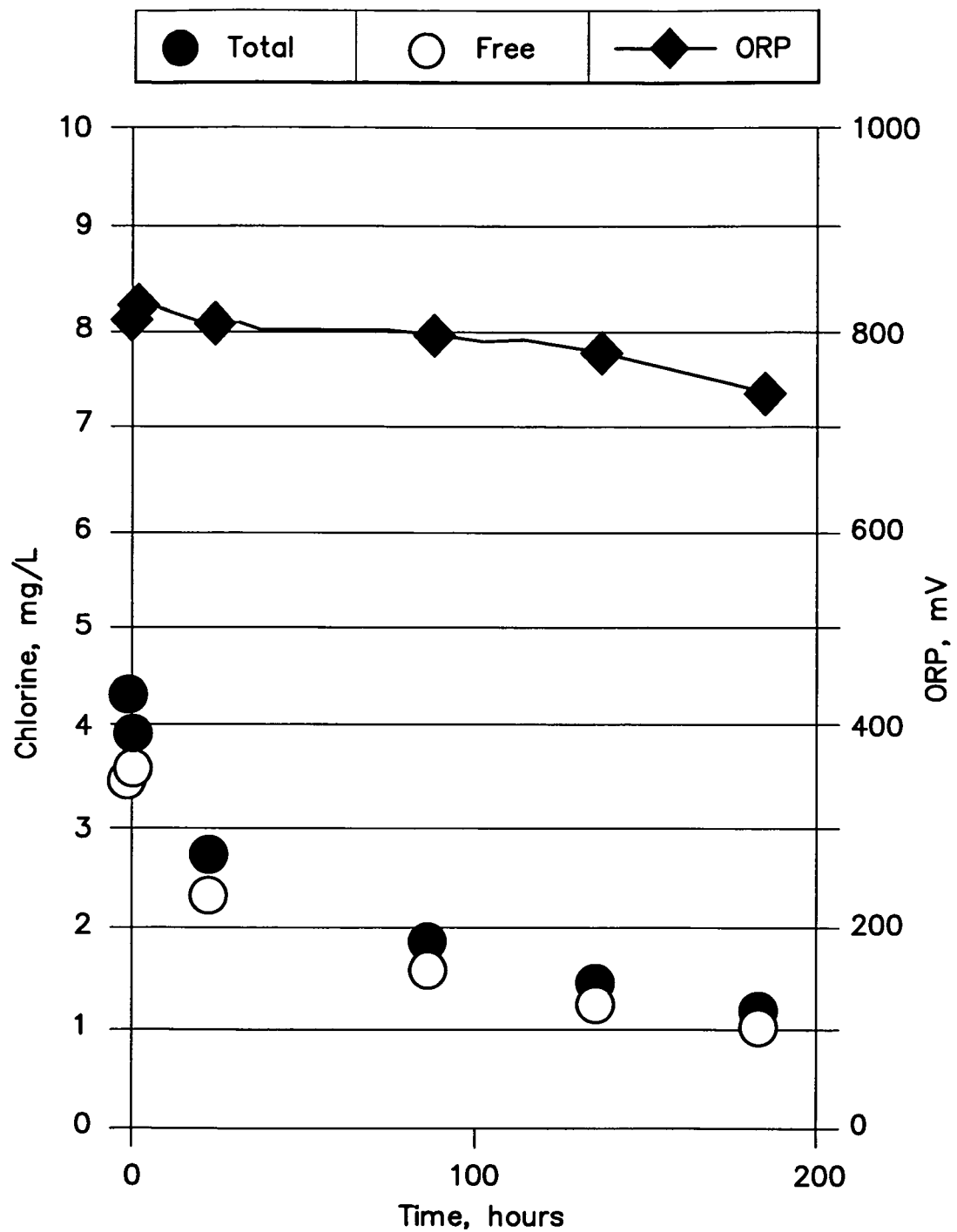
FIG. 11B is a graph illustrating the change in ORP and chlorine concentration over time in a seawater sample treated with 5 mg/L of chlorine.
Figure 11C:
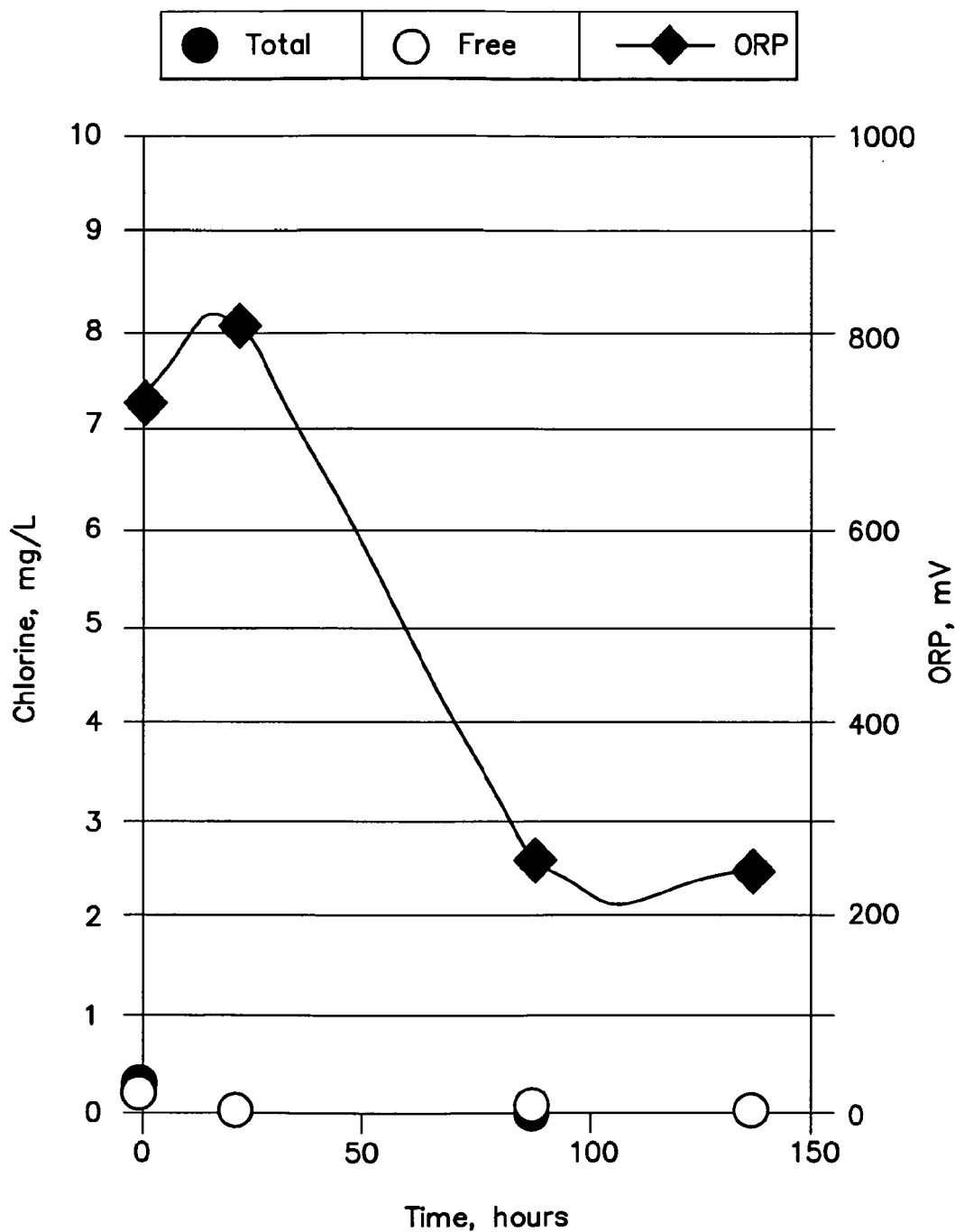
FIG. 11C is a graph illustrating the change in ORP and chlorine concentration over time in a seawater sample treated with chlorine sufficient to create an initial ORP of about 750 mV in the sample.

Five days after treating, the ORP, free chlorine, combined chlorine, and DBP levels of the samples were measured. The results are presented in FIGS. 11A-11C and Table 1.

TABLE 1

| Chlorine Dose | Disinfection By-Products, µg/L | | |
|---|---|---|---|
| | THM | HAA | Bromate |
| 10 mg/L | 184 | 53.4 | 48 |
| 5 mg/L | 157 | 46.5 | <25 |
| To 750 mV | 26 | 11.0 | <25 |

As can be seen from the presented results, disinfection of seawater with a chlorine dose of either 10 mg/L or 5 mg/L without taking into account the actual requirement for chlorine as demanded by seawater quality can lead to several undesirable effects. In the samples treated with 10 mg/L and with 5 mg/L chlorine, ORP values remained above about 700 mV throughout all five days of testing. This reflects that a high residual chlorine level remained present in the samples throughout the test period. Because most of the chlorinated species remained present as highly-reactive free chlorine, this would have created significant, if not dangerous, potential corrosion problems as well as formation of DBP, should such a dosing scheme have been performed in the ballast tanks of an ocean going ship.

Systems utilizing chlorine dosing to achieve target ORP values, in contrast, facilitates reduction of the potential for these problems. Using ORP for selecting an optimum chlorine dose level facilitates a five to nine-fold reduction in DBP and a 100 to 1.000-fold reduction in residual chlorine levels. In a system using ORP for selecting a desirable chlorine dose level there would be little, or even no need for dechlorination during deballasting operations.

Example 7

Four 50 liter samples of seawater were collected in North Sea off the coast of the Texel Island in June, 2008.

Two samples were filtered using a 50 micron filter; one of these samples was maintained as a control sample (FC) and the other sample (F) was treated with chlorine to achieve an ORP level of about 700 mV. The other two samples were left unfiltered. One of the unfiltered samples was used as a control sample (UFC) and the other sample (UF) was treated to achieve an ORP level of about 700 mV. All four samples were placed for five days in a temperature controlled environment to maintain their original temperature of about 15° C. to about 18° C. After five days the samples were tested for levels of zooplankton (organisms greater than 50 microns in size) and phytoplankton (organisms smaller than 50 microns). While there was abundance of phytoplankton observed in both control samples, FC and UFC, there were no viable phytoplankton observed in the treated samples F and UF. The results for zooplankton were different and are presented in Table 2.

TABLE 2

| Sample | Number of viable zooplankton per liter | |
|---|---|---|
| | Immediately after treatment | 5 Days After Treatment |
| FC | 0 | 13 |
| F | 0 | 0 |
| UFC | 256 | 370 |
| UF | 11 | 3 |

These results show that the seawater sample contained about 256 live zooplankton per liter. The use of the 50 micron filter removed substantially all zooplankton from the water to be treated with chlorine. Immediately after addition of chlorine to the unfiltered sample UF, the number of viable zooplankton was reduced from 256 to about 11 organisms per liter. This illustrates the advantageous oxidizing power of chlorine and its potential for remediating zooplankton. However, even after five days, there were still three viable organisms present in the UF sample. This shows that certain organisms require a high chlorine level—exposure time operating envelope to be destroyed—either a high chlorine dose level or a long contact time, or both.

There were no viable organisms observed in the F sample, which was filtered and treated with chlorine to achieve an ORP value of about 700 mV. In addition, it should be noted that after five days residual chlorine in the F sample was about 0.1 mg/L, with about half of that being free chlorine—a level that would not typically present any corrosion or DBP concerns.

However, after five days some viable organisms have appeared in the filtered control sample FC, most likely due to a growth of certain zooplankton species that were less that 50 microns in size before the test and were not removed by the 50 micron filter; chlorine treatment however, inhibited their growth as indicated by the lack of biological activity in the F sample.

Example 8

Figure 12A:
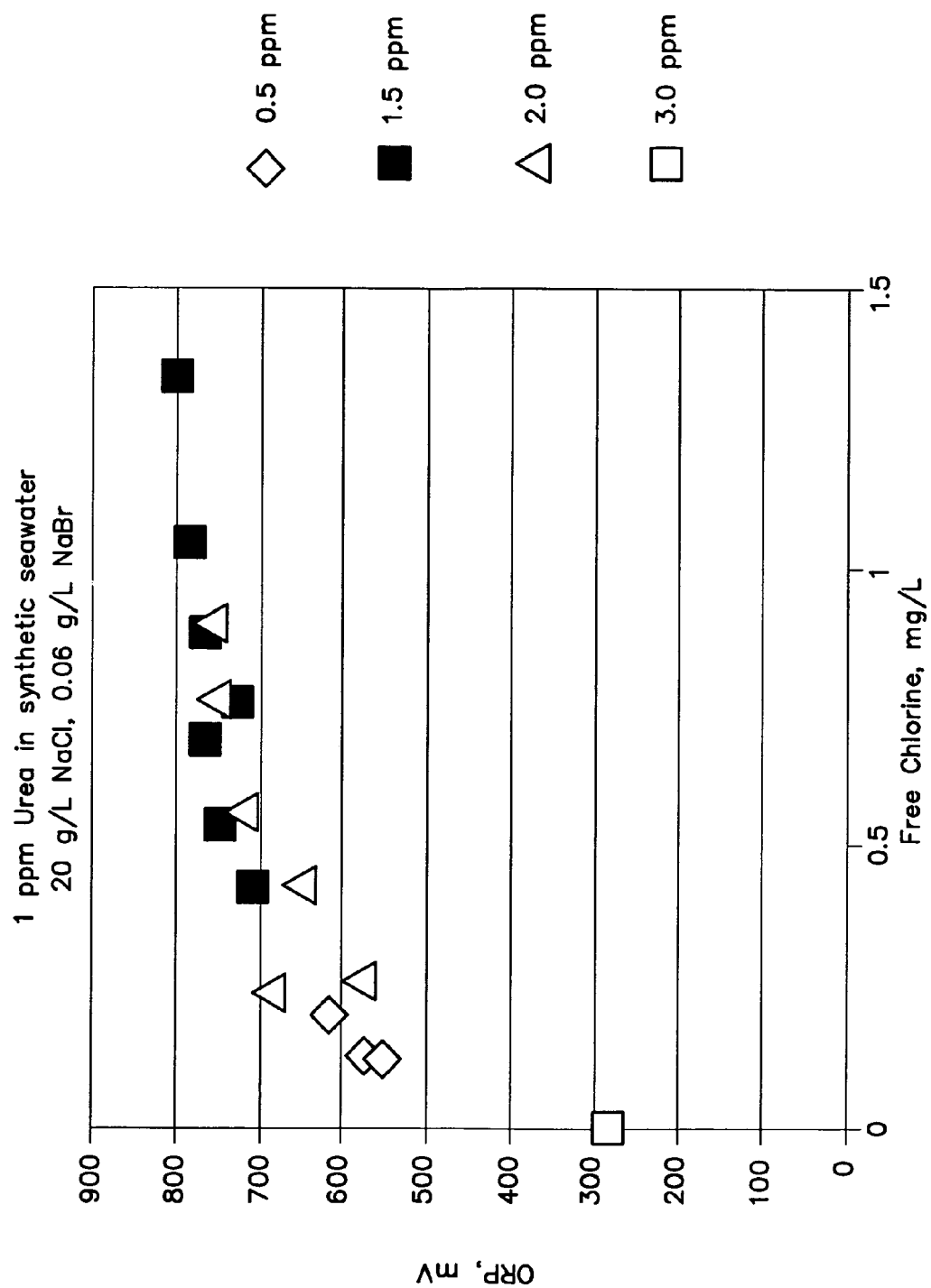
FIG. 12A is a graph illustrating ORP versus free chlorine in a synthetic seawater sample dosed with 1 ppm urea and different chlorine levels.
Figure 12B:
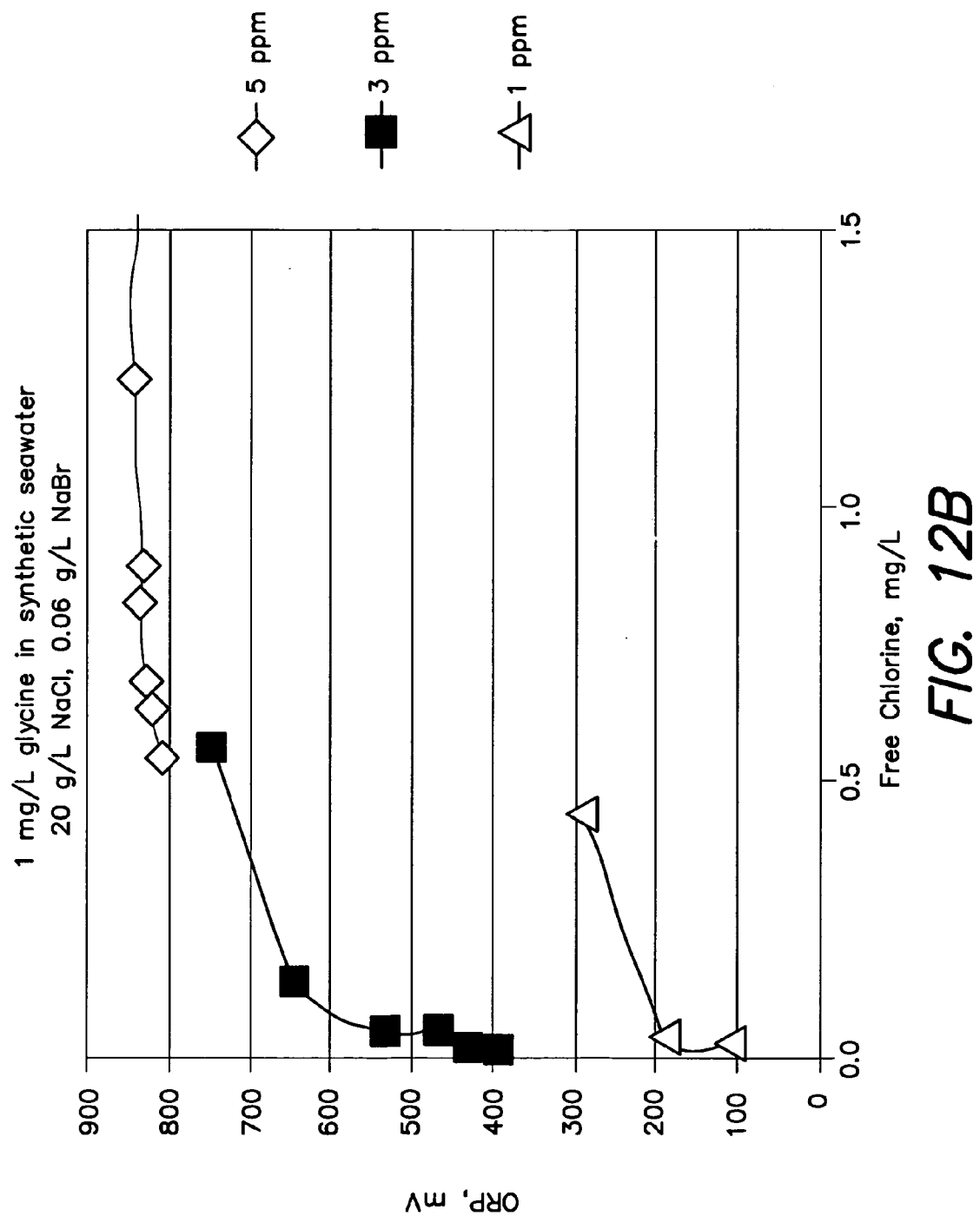
FIG. 12B is a graph illustrating ORP versus free chlorine in a synthetic seawater sample dosed with 1 ppm glycine and different chlorine levels.
Figure 12C:
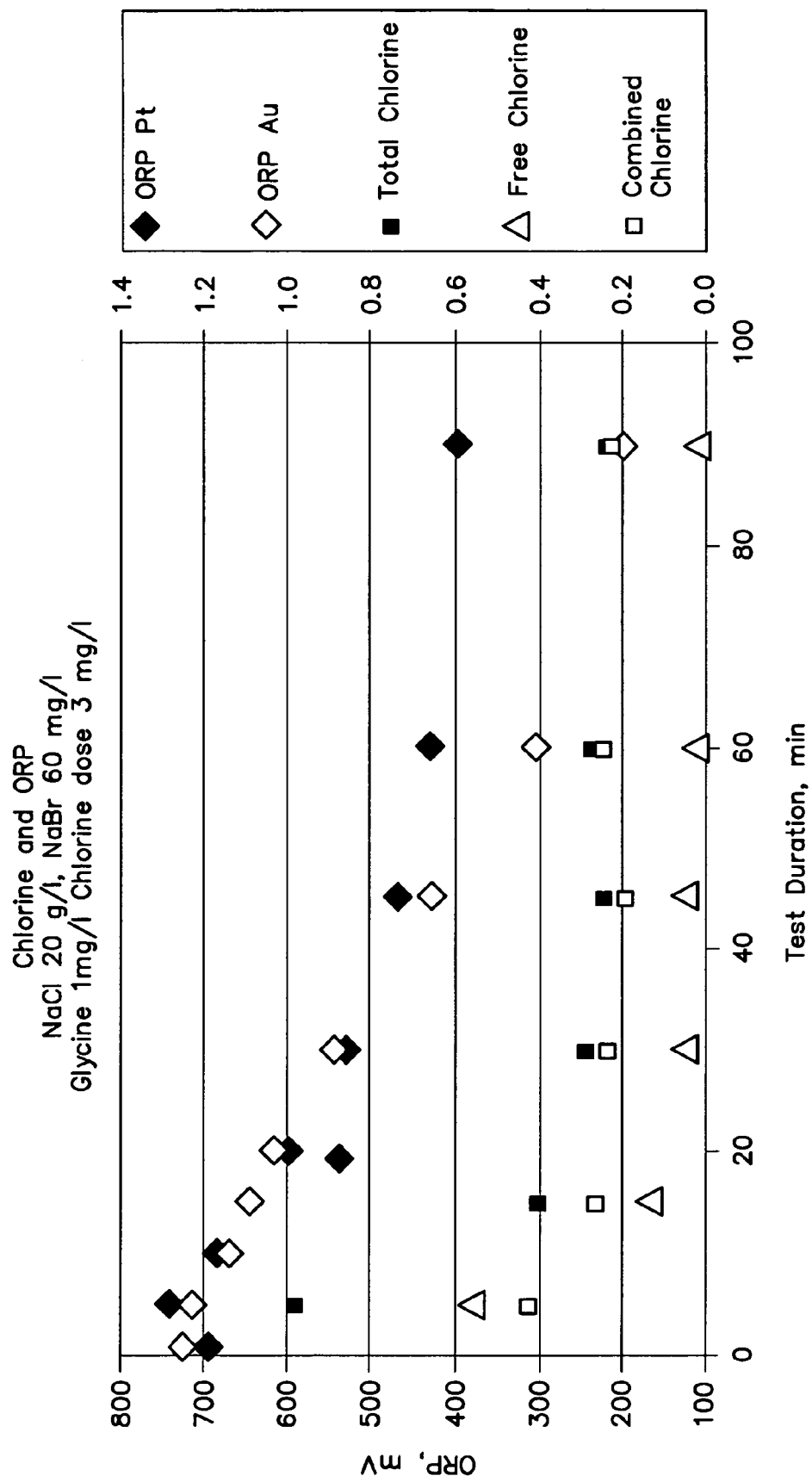
FIG. 12C is a graph illustrating ORP and total, free, and combined chlorine concentration over time in a synthetic seawater sample dosed with 1 ppm glycine at various chlorine dose levels.

Two samples of synthetic seawater (20 g/L NaCl and 0.06 g/L NaBr in water) were prepared. 1 ppm of urea was added to one sample and 1 ppm of glycine was added to the other. The two samples were dosed with chlorine at different levels and monitored over a period of approximately 60 minutes. Free chlorine concentration and ORP values of each of the samples were measured approximately every five to ten minutes using platinum tipped ORP sensor probes. The resultant data is illustrated in FIGS. 12A and 12B. FIG. 12C illustrates the change in ORP and total, free, and combined chlorine concentration over time in the glycine doped sample.

The data show that in the urea dosed sample, the measured ORP values correspond with the free chlorine concentrations. In contrast, the ORP/chlorine relationship in the glycine dosed sample varies. This illustrates that ORP values may vary in different manners with chlorine dosage for different reductants.

The data in FIGS. 12A and 12B show that utilizing ORP-based treating systems can provide stable levels of oxidizing environments whereas chlorine concentration-based control can lead to undesirably low levels of oxidizing species.

In FIG. 12C, a gold tipped ORP sensor probe was used as well as a platinum tipped ORP sensor probe to monitor the level of glycine-doped (1 mg/L) synthetic seawater after treating with 3 mg/L of chlorine. The data in FIG. 12C show that both ORP and free chlorine levels may change over time after an initial dose of chlorine into a sample containing a reductant, which illustrates the desirability of frequent, if not constant monitoring of ORP levels in ballast water. The data in FIG. 12C also illustrates the advantages of utilizing gold tipped ORP sensor probes over conventional platinum tipped sensor probes because the data illustrates that the readings from the gold tipped sensor probe continued to track the decreasing level of free chlorine over time while the readings from the platinum tipped sensor probe began to plateau at the lower levels of free chlorine present in the sample at times of about 60 minutes or more.

ORP control can therefore be successfully used to maintain the minimal effective concentration of the biocide, thus assuring complete disinfection of the ballast water while reducing the potential for corrosion and formation of DBP.

Chlorination can provide cost effective ballast water treatment (BWT). Chlorination, however, creates corrosion issues and requires dechlorination systems to prevent or reduce environmental impact or damage during de-ballasting operations. Studies directed to chlorination-based ballast water treatment typically emphasize the effect that chlorine demand has on the effectiveness of the chlorine concentration. Therefore, the results are typically presented in terms of chlorine dose and chlorine residual or total residual chlorine (TRC).

Having now described some illustrative embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. In particular, although many of the examples presented herein involve specific com- binations of method acts or system elements, it should be understood that those acts and those elements may be combined in other ways to accomplish the same objectives.

Those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is therefore to be understood that the embodiments described herein are presented by way of example only and that, within the scope of the appended claims and equivalents thereto; the invention may be practiced otherwise than as specifically described.

Moreover, it should also be appreciated that the invention is directed to each feature, system, subsystem, or technique described herein and any combination of two or more features, systems, subsystems, or techniques described herein and any combination of two or more features, systems, subsystems, and/or methods, if such features, systems, subsystems, and techniques are not mutually inconsistent, is considered to be within the scope of the invention as embodied in the claims. Further, acts, elements, and features discussed only in connection with one embodiment are not intended to be excluded from a similar role in other embodiments.

As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A shipboard water treatment system comprising:
    a source of seawater in a sea chest;
    a ballast tank fluidly connected to the sea chest;
    a shipboard cooling water system fluidly connected to the sea chest;
    a first sensor disposed to measure and transmit a first measured signal representative of an oxidation reduction potential (ORP) of seawater in the sea chest;
    a second sensor disposed to measure and transmit a second measured signal representative of an ORP of seawater in the ballast tank;
    a biocide source that produces a biocide containing stream disposed to introduce a biocide into the seawater in the sea chest via a first flow path comprising a first line that delivers the biocide containing stream into the sea chest, to introduce the biocide into the seawater in the ballast tank via a second flow path split from the first flow path comprising a second line, and to receive seawater withdrawn from the cooling water system; and
    a controller disposed to receive the first measured signal from the first sensor and to receive the second measured signal from the second sensor, and configured to generate and transmit an output signal, based at least partially on the first measured signal, the second measured signal, and a target ORP value in a range of from about 200 mV to about 1000 mV, to the biocide source to regulate a rate of introduction of the biocide into the seawater in the ballast tank, and into the seawater in the sea chest to achieve a target biofouling control value in water introduced into the shipboard cooling water system.

2. The shipboard water treatment system of claim 1, wherein the biocide source comprises an electrolyzer configured to generate a halogen-based biocide.

3. The shipboard water treatment system of claim 2, wherein the electrolyzer comprises an inlet fluidly connected to the source of seawater, and configured to generate a hypochlorite compound.

4. The shipboard water treatment system of claim 3, wherein a first outlet of the electrolyzer is fluidly connected to an outlet of the source of seawater at a point downstream thereof and upstream of the inlet of the electrolyzer.

5. The shipboard water treatment system of claim 4, wherein a second outlet of the electrolyzer is fluidly connected downstream of the inlet of the electrolyzer and upstream of an inlet of a ballast tank.

6. The shipboard water treatment system of claim 2, wherein the electrolyzer comprises an inlet fluidly connected to the source of seawater, and configured to generate a hypochlorite compound and an oxygenated species.

7. The shipboard water treatment system of claim 6, wherein the controller is configured to provide the output signal that regulates an operating current density through the electrolyzer of at least about 1,000 Amp m$^2$.

8. The shipboard water treatment system of claim 7, wherein a target ORP value for the seawater in the ballast tank is in a range of from about 500 mV to about 750 mV.

9. The shipboard water treatment system of claim 7, further comprising a degassing tank fluidly connected downstream of the electrolyzer.

10. The shipboard water treatment system of claim 1, wherein the target ORP value is based on a regulated disinfection requirement.

11. The shipboard water treatment system of claim 1, wherein electrocatalytically generated agents utilized in disinfection of ballast water are also used to inhibit biofouling of a shipboard cooling water system.

12. The shipboard water treatment system of claim 11, wherein a lower oxidizer concentration is used for biofouling than for disinfection.

13. The shipboard water treatment system of claim 1, wherein the controller is configured to control biofouling of the shipboard cooling water system when the ship is not conducting ballasting operations.

14. The system of claim 13, wherein biofouling control of the shipboard cooling water system is performed when the ship is not conducting ballasting operations.

15. The shipboard water treatment system of claim 1, configured to:
    withdraw a portion of seawater from the sea chest;
    introduce the portion of seawater into the biocide source;
    withdraw a balance of seawater to be introduced into the ballast tank from the sea chest;
    filter the balance of the seawater to form a filtered seawater; and
    introduce the filtered seawater into the ballast tank.

* * * * *